United States Patent
Asaoka et al.

[11] Patent Number: 5,885,482
[45] Date of Patent: Mar. 23, 1999

[54] LIQUID CRYSTAL DEVICE, PRODUCTION PROCESS THEREOF AND LIQUID CRYSTAL APPARATUS

[75] Inventors: Masanobu Asaoka, Yokohama; Yukio Hanyu, Isehara; Kenji Shinjo; Koichi Sato, both of Atsugi; Masahiro Terada, Hadano; Shosei Mori, Hiratsuka; Shinichi Nakamura, Isehara; Syuji Yamada, Atsugi; Ikuo Nakazawa, Atsugi; Koji Noguchi, Atsugi, all of Japan

[73] Assignee: Canon Kabushiki Kaisha, Tokyo, Japan

[21] Appl. No.: 775,792

[22] Filed: Dec. 27, 1996

[30] Foreign Application Priority Data

Dec. 28, 1995 [JP] Japan .................... 7-352162
Dec. 28, 1995 [JP] Japan .................... 7-352261

[51] Int. Cl.$^6$ .................... C09K 19/56; C09K 19/52; G02F 1/1337
[52] U.S. Cl. .................... 252/299.01; 252/299.01; 252/299.5; 428/1; 349/128
[58] Field of Search .................... 252/299.01, 299.4, 252/299.5; 428/1; 349/126, 127, 128

[56] References Cited

U.S. PATENT DOCUMENTS

| | | | |
|---|---|---|---|
| 4,778,259 | 10/1988 | Kitayama et al. | 350/350 S |
| 4,820,026 | 4/1989 | Okada et al. | 350/341 |
| 4,883,344 | 11/1989 | Okada et al. | 350/339 R |
| 4,932,757 | 6/1990 | Hanyu et al. | 350/339 R |
| 5,054,890 | 10/1991 | Hanyu et al. | 350/344 |
| 5,099,344 | 3/1992 | Tsuboyama et al. | 359/79 |
| 5,103,331 | 4/1992 | Taniguchi et al. | 359/81 |
| 5,129,727 | 7/1992 | Hanyu et al. | 359/75 |
| 5,165,076 | 11/1992 | Tsuboyama et al. | 359/75 |
| 5,192,596 | 3/1993 | Hanyu et al. | 428/1 |
| 5,221,981 | 6/1993 | Kodera et al. | 359/76 |
| 5,262,082 | 11/1993 | Janulis et al. | 252/299.01 |
| 5,268,780 | 12/1993 | Hanyu et al. | 359/75 |
| 5,268,783 | 12/1993 | Yoshinaga et al. | 359/103 |
| 5,285,304 | 2/1994 | Hotta et al. | 359/81 |
| 5,316,805 | 5/1994 | Hanyu et al. | 428/1 |

(List continued on next page.)

FOREIGN PATENT DOCUMENTS

| | | |
|---|---|---|
| 56-107216 | 8/1981 | Japan . |
| 59-193426 | 11/1984 | Japan . |
| 59-193427 | 11/1984 | Japan . |
| 60-156046 | 8/1985 | Japan . |
| 60-156047 | 8/1985 | Japan . |
| 2142753 | 5/1990 | Japan . |
| 22396 | 11/1993 | WIPO . |

OTHER PUBLICATIONS

Future Liquid Crystal Display and Its Materials, A.Fukuda ed. (1992) 37–72.
Chandani et al., Jap.J.Ap.Phys., vol.27 (1988) L729.
Schadt et al., App.Phys.Lett, vol.18, No.4 (1971) pp.127–128.

*Primary Examiner*—Shean C. Wu
*Attorney, Agent, or Firm*—Fitzpatrick, Cella, Harper & Scinto

[57] ABSTRACT

A liquid crystal device is constituted by a pair of oppositely disposed substrates including a first substrate provided with a first alignment control layer which has been subjected to a uniaxial aligning treatment and a second substrate provided with a second alignment control layer which has not been subjected to a uniaxial aligning treatment, a sealing member disposed so as to seal up a peripheral portion of the first and second substrates to form a spacing therebetween, and a dispersion member (e.g., spacer beads or adhesive particles) and a liquid crystal disposed in the spacing while contacting the first and second aligning control layers. The dispersion member has been subjected to a surface treatment with a material constituting the second alignment control layer. The surface-treated dispersion member is effective in suppressing an occurrence of a reverse domain within a display region of the liquid crystal device, thus preventing flickering and improving a contrast.

25 Claims, 12 Drawing Sheets

U.S. PATENT DOCUMENTS

| | | | |
|---|---|---|---|
| 5,320,883 | 6/1994 | Asaoka et al. | 428/1 |
| 5,325,219 | 6/1994 | Hanyu et al. | 359/78 |
| 5,330,803 | 7/1994 | Takao et al. | 428/1 |
| 5,353,141 | 10/1994 | Onuma et al. | 359/76 |
| 5,372,745 | 12/1994 | Yoshinaga et al. | 252/299.01 |
| 5,381,256 | 1/1995 | Hanyu et al. | 359/75 |
| 5,400,159 | 3/1995 | Takao et al. | 359/76 |
| 5,419,931 | 5/1995 | Asaoka et al. | 428/1 |
| 5,419,932 | 5/1995 | Togano et al. | 428/1 |
| 5,422,748 | 6/1995 | Yamashita et al. | 359/75 |
| 5,426,525 | 6/1995 | Hanyu et al. | 359/76 |
| 5,453,861 | 9/1995 | Shinjo et al. | 359/78 |
| 5,464,668 | 11/1995 | Asaoka et al. | 428/1 |
| 5,473,448 | 12/1995 | Yoshinaga et al. | 359/51 |
| 5,475,515 | 12/1995 | Yoshinaga et al. | 359/52 |
| 5,497,257 | 3/1996 | Hotta et al. | 359/81 |
| 5,510,159 | 4/1996 | Asaoka et al. | 428/1 |
| 5,518,782 | 5/1996 | Takao et al. | 428/1 |
| 5,540,858 | 7/1996 | Yoshinaga et al. | 252/299.01 |
| 5,543,943 | 8/1996 | Hanyu et al. | 359/43 |
| 5,552,193 | 9/1996 | Asaoka et al. | 428/1 |
| 5,557,435 | 9/1996 | Hanyu et al. | 359/75 |
| 5,576,864 | 11/1996 | Takao et al. | 359/76 |
| 5,583,682 | 12/1996 | Kitayama et al. | 349/172 |
| 5,587,211 | 12/1996 | Togano et al. | 428/1 |
| 5,666,217 | 9/1997 | Kaneko et al. | 349/122 |

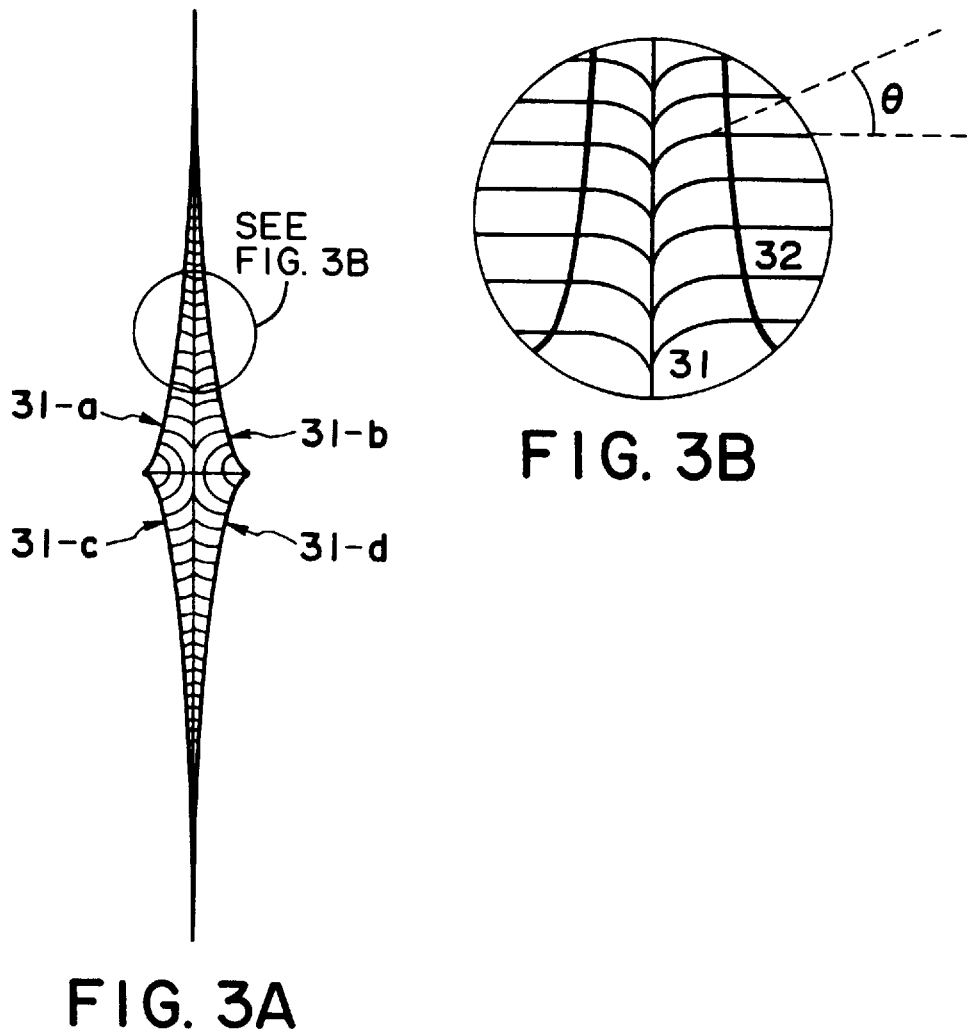

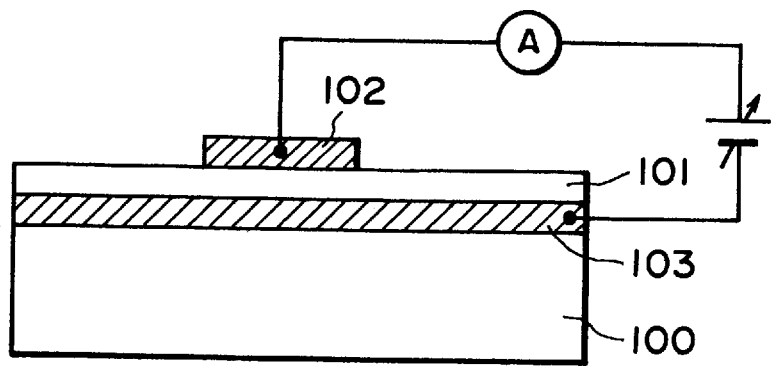
F I G. 12
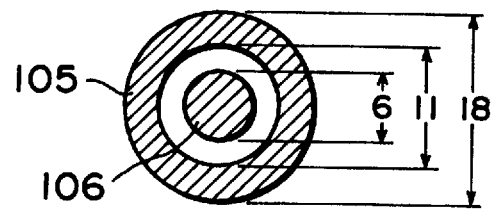
F I G. 13A
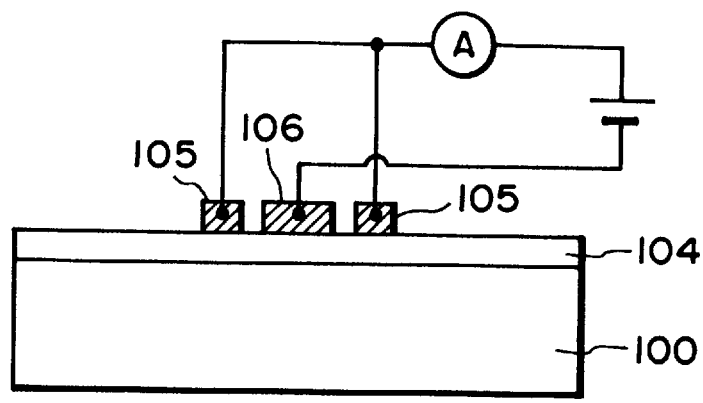
F I G. 13B

LIQUID CRYSTAL DEVICE, PRODUCTION PROCESS THEREOF AND LIQUID CRYSTAL APPARATUS

FIELD OF THE INVENTION AND RELATED ART

The present invention relates to a liquid crystal device, particularly a liquid crystal device using a chiral smectic liquid crystal for use in light-valves for flat-panel displays, projection displays, printers, etc. The present invention also relates to a process for producing the liquid crystal device and a liquid crystal apparatus using the liquid crystal device.

There has been known a cathode ray tube (CRT) as a display device. The CRT has widely been used as a display terminal for outputting motion pictures of a television receiver or a video tape recording (VTR) apparatus or used as a monitor for a personal computer. However, in recent years, it has been found that an electromagnetic wave generated by the CRT adversely affects human body. As a result, the CRT can break health of video display terminal (VDT) operators in some cases. In addition, the CRT has a structure including a large volume behind a picture area (display portion), whereby the convenience or facility of information equipment and space-saving utilization of an office or a house in which the CRT is used are hindered.

Liquid crystal devices have been used as a display device having solved the above-mentioned problems of the CRT. For instance, there have been known liquid crystal devices using use TN (twisted nematic) type liquid crystals, as shown in "Voltage-Dependent Optical Activity of a Twisted Nematic Liquid Crystal" by M. Schadt and W. Helfrich "Applied Physics Letters" Vol. 18, No. 4 (Feb. 15, 1971) pp. 127–128.

One of the above-mentioned TN-type liquid crystal devices is a simple matrix-type liquid crystal device having the advantage of easy production and inexpensive production costs. When the liquid crystal device is driven by using an electrode matrix structure with an increased pixel density in accordance with a multiplex driving scheme, the liquid crystal device is liable to encounter a problem of occurrence of crosstalk, so that the number of pixels is restricted. Further, the use of the device as a display device is also limited since the response speed is too slow, i.e., on the order of at least several ten milli-seconds.

In recent years, there have been proposed liquid crystal devices using a thin film transistor (TFT). These liquid crystal devices can control a display state pixel by pixel since each pixel is provided with a transistor, whereby the devices solve problems of crosstalk and response speed. However, as these devices have a larger picture area, it is industrially more difficult to prepare a liquid crystal device with no defective pixels. Even if it is possible to prepare such a liquid crystal device, the device is more expensive.

To overcome the above-mentioned drawbacks of such conventional liquid crystal devices, the use of liquid crystal devices using a liquid crystal material having bistability has been proposed by Clark and Lagerwall (e.g. Japanese Laid-Open Patent Appln. (JP-A) No. 56-107216 corr. to U.S. Pat. No. 4,367,924, etc.). In this instance, as the liquid crystal material having bistability, a ferroelectric liquid crystal having chiral smectic C-phase (SmC*) or H-phase (SmH*) is generally used. The ferroelectric liquid crystal can effect inversion switching due to its spontaneous polarization, thus showing a very high response speed. Further, the ferroelectric liquid crystal shows bistability providing a memory characteristic and is excellent in view angle characteristics, so that a liquid crystal device using a ferroelectric liquid crystal is considered suitable for a display device or light-valve having properties including high-speed responsiveness, high resolution and a large picture area. In recent years, there has been also proposed an anti-ferroelectric chiral smectic liquid crystal device assuming three stable states, as described in "Japanese Journal of Applied Physics" vol. 27, p. L729 (1988) by Chanani and Takezoe et al.

Further, there has been the recent trend in layer structure of a (chiral smectic) liquid crystal wherein a high contrast ratio is intended to be realized by providing the liquid crystal with a bookshelf layer structure (hereinafter referred to as "bookshelf structure") in which boundaries of each liquid crystal layer are disposed in parallel with each other or with a structure close to the bookshelf structure (e.g., Atsuo Fukuda (Editor)) "Future Liquid Crystal Display and Its Materials" (1992), issued by K.K. CMC (Tokyo Japan).

Further, there have been also proposed a mesomorphic (liquid crystal) compound having a perfluoroether terminal portion (U.S. Pat. No. 5,262,082 and International Publication No. WO93/22396) and a liquid crystal composition (Marc D. Radcliffe et al: The 4th International Ferroelectric Liquid Crystal Conference, P-46 (1993)) as materials exhibiting a bookshelf structure or a structure close thereto.

According to our study, the liquid crystal device using a liquid crystal assuming a chiral smectic phase, particularly having ferroelectricity is accompanied with the following problems leading to deterioration in display performance.

First, such a liquid crystal device involves a problem of an occurrence of a "reverse domain" (herein used as a term representing a domain in one stable state of a liquid crystal having bistability occurring in case where another domain in the other stable state is selected by electric field application) leading to a lowering in contrast and an occurrence of flickering. More specifically, a line-sequential driving scheme is effective in driving a memory-type liquid crystal device. In this driving scheme, when, e.g., a liquid crystal device of a simple matrix-type having 1000 scanning lines is driven, only a data signal is applied for a period (a time required for effecting writing of one picture frame) of 25 msec in the case of a writing (frame) frequency of 40 Hz and for a period of 50 msec in the case of a writing frequency of 20 Hz. At this time, liquid crystal molecules are placed in a vibration state. In this case, if a portion where a stability of a memory state of the liquid crystal molecules is insufficient is present, there occurs and grows a reverse domain different from a domain in a selected stable state at the portion when writing operation is performed, thus lowering a contrast and causing flickering.

In the liquid crystal device, a cell structure is appropriately designed in view of properties of a liquid crystal material used, e.g., phase transition characteristics, in order to effect optimal alignment control of the liquid crystal material. For this purpose, e.g., a cell structure wherein a liquid crystal material is sandwiched between a pair of substrates including one substrate provided with a uniaxially treated alignment control layer and the other substrate provided with a non-uniaxially treated alignment control layer may be adopted. Such a cell structure may particularly preferably be used in the case of controlling an alignment state of chiral smectic liquid crystal molecules lacking a cholesteric phase.

In this case, the number and the size of alignment defects attributable to an occurrence of the reverse domain described above is largely affected by a surface energy of the alignment control layers, particularly the alignment control layer which has not been subjected to a uniaxial aligning treatment. In case where the non-uniaxially treated alignment contrast layer has a large surface energy, when re-orientation of the liquid crystal is performed from an isotropic liquid state (Iso. state), connection (or joint) failure between batonnets is caused in some cases, thus resulting in an alignment defect due to ununiformity (unhomogeneity) of smectic liquid crystal layers. Such an alignment defect can be decreased by using an alignment control layer having a small surface energy to decrease an occurrence of connection failure of the batonnets.

Incidentally, in the liquid crystal device, spacer beads comprising a hard (or rigid) material are generally dispersed at a certain density within the liquid crystal layer between the pair of substrates in order to uniformly control a cell gap (a thickness of the liquid crystal layer). These spacer beads per se cause alignment defects of the liquid crystal disposed between the pair of substrates. In such a case, even if the surface energy of the alignment control layer is lowered, the alignment defects corresponding to the number of the spacer beads are consequently caused to occur.

In another aspect, the chiral smectic (ferroelectric) liquid crystal device involves a problem such that an alignment performance is lowered when a local strain (distortion) is exerted on a liquid crystal panel (cell). In order to solve this problem, adhesion of a particle-shaped adhesive to the pair of substrates in a dispersion state is effective. However, the dispersed adhesive particles cause defects in the liquid crystal layer at respective adhesive portions since the adhesive portions function as nuclei of the defects. The adhesive portions provide a difference in switching characteristic between two stable states of liquid crystal molecules, so that a reverse domain in one stable state (of the two stable states) occurs and grows at the adhesive portions when the other stable state is selected for writing, thus leading to a lowering in a contrast and flickering.

Further, the adhesive particles is accompanied with a problem of peeling from the non-uniaxially treated alignment control layer. Particularly, in view of aligning control, when a cell structure wherein a particle-shaped adhesive is dispersed in a dispersion state between two alignment control layers only one of which is subjected to a uniaxial aligning treatment is adopted, the resultant cell is liable to cause a peeling of the dispersed adhesive particles from the alignment control layer which has not been subjected to the uniaxial aligning treatment and also lowers its shock (impact) resistance.

SUMMARY OF THE INVENTION

In view of the above-mentioned problems, an object of the present invention is to provide a liquid crystal device including a pair of substrates and a liquid crystal and a dispersion member disposed between the substrates wherein an occurrence of a reverse domain resulting from the dispersion member and leading to flickering is suppressed to improve a switching characteristic of the liquid crystal.

Another object of the present invention is to provide a process for producing the liquid crystal device and a liquid crystal apparatus using the liquid crystal device.

According to the present invention, there is provided a liquid crystal device, comprising:

a pair of oppositely disposed substrates including a first substrate provided with a first alignment control layer which has been subjected to a uniaxial aligning treatment and a second substrate provided with a second alignment control layer which has not been subjected to a uniaxial aligning treatment, a sealing member disposed so as to seal up a peripheral portion of the first and second substrates to form a spacing therebetween, and a dispersion member and a liquid crystal disposed in the spacing while contacting the first and second aligning control layers, wherein said dispersion member has been subjected to a surface treatment with a material constituting the second alignment control layer.

According to the present invention, there is also provided a process for producing a liquid crystal device comprising a pair of oppositely disposed substrates including a first substrate provided with a first alignment control layer which has been subjected to a uniaxial aligning treatment and a second substrate provided with a second alignment control layer which has not been subjected to a uniaxial aligning treatment, a sealing member disposed so as to seal up a peripheral portion of the first and second substrates to form a spacing therebetween, and a dispersion member and a liquid crystal disposed in the spacing while contacting the first and second aligning control layers;

the process comprising:
    a step of forming the first alignment control layer on the first substrate, and
    a step of surface-treating the dispersion member with a material constituting the second alignment control layer.

The present invention further provides liquid crystal apparatus including the above-mentioned liquid crystal device and a drive means for driving the device.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 3 is a schematic view for illustrating an alignment defect and a relationship between a smectic layer structure therein and that of a surrounding portion.

FIG. 12 is an illustration of a system for measuring a volume resistivity of an alignment control in a thickness direction in a liquid crystal device according to the invention.

FIGS. 13A and 13B are respectively a schematic plan view of an electrode pattern and a sectional view of a system for measuring a volume resistivity of an alignment control layer in a sheet extension direction in a liquid crystal device according to the invention.

DETAILED DESCRIPTION OF THE PREFERRED EMBODIMENTS

The liquid crystal device according to the present invention wherein a liquid crystal and a dispersion member (a member disposed in a dispersion state) are disposed between a first substrate provided with an alignment control layer which has been subjected to a uniaxial aligning treatment (uniaxially treated alignment control layer) and a second substrate provided with an alignment control layer which has not been subjected to a uniaxial aligning treatment (non-uniaxially treated alignment control layer) and are surrounded or enclosed by a sealing agent to form a region substantially corresponding to an effective optical modulation region (display region) is characterized by surface-treating the dispersion member contacting the respective alignment control layers formed on the pair of substrates by using a material constituting the non-uniaxially treated alignment control layer.

The liquid crystal may preferably assume a chiral smectic phase. The above cell structure is particularly effective in improving an alignment control ability to a chiral smectic liquid crystal lacking a cholesteric phase on temperature decrease.

As the dispersion member disposed in contact with both of the alignment control layers, spacer beads (spacer member) for determining an effective distance between the pair of substrate (i.e., a cell gap) and uniformly holding the substrate with the cell gap in an entire region surrounded by the sealing agent may be used. Further, adhesive particles (particle-shaped adhesive) for strongly bonding the pair of substrates to each other and retaining the cell gap and the liquid crystal alignment state stably may also be used as the dispersion member. The adhesive beads may preferably be those comprising a thermosetting resin or a thermoplastic resin.

Particularly, in the case of using the chiral smectic liquid crystal, liquid crystal molecules form a plurality of smectic liquid crystal layers between the substrates. In this case, a resultant liquid crystal cell (device) can cause a defect (called sanded texture) due to an external shock in some cases. For this reason, in a particularly preferred embodiment of the present invention, the surface-treated adhesive particles and the surface-treated spacer beads are disposed between the pair of substrates in a dispersion state at an appropriate dispersion density.

Hereinbelow, an embodiment of the liquid crystal device of the present invention will be described specifically with reference to FIG. 1.

Figure 1:
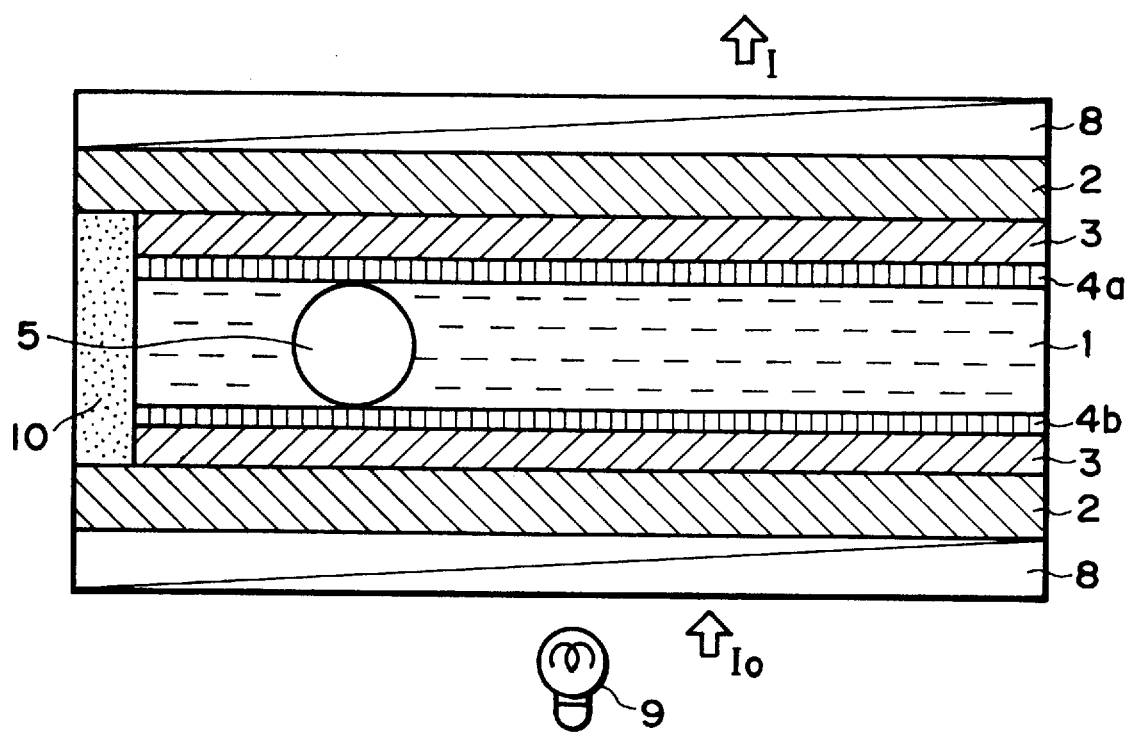
FIG. 1 is a schematic sectional view of an embodiment of a liquid crystal device according to the present invention.

FIG. 1 is a schematic sectional view of an embodiment of the liquid crystal device for explanation of the structure thereof.

Referring to FIG. 1, the liquid crystal device includes a liquid crystal layer 1 comprising a liquid crystal material, preferably a liquid crystal composition disposed between a pair of substrates 2 each having thereon a group of transparent electrodes 3 for applying a voltage to the liquid crystal layer 1 and an alignment control layer 4a (or 4b). The periphery of the substrates 2 is sealed up with a sealing member (sealing agent) 10. Outside the substrates 2, a pair of polarizers 8 are disposed so as to modulate incident light $I_0$ from a light source 9 in cooperation with the liquid crystal 1 to provide modulated light I. In a region surrounded by the sealing member 10 and the substrates, spacer beads (spacer member) 5 are disposed.

Under each of the alignment control layers 4a and 4b, an insulating layer may be disposed, as desired.

Each of two substrates 2 comprise a material such as glass or plastic and is coated with a transparent electrode 3 having a prescribed pattern (e.g., a pattern in a matrix form) and comprising a transparent electroconductive film of e.g., $In_2O_3$, $SnO_2$ or ITO (indium-tin-oxide).

The liquid crystal layer 1 may preferably comprise a chiral smectic liquid crystal composition which does not assume a cholesteric phase on temperature decrease. In order to appropriately control an alignment characteristic of the alignment control layers 4a and 4b to provide liquid crystal molecules with a uniform initial alignment state, the alignment control layers are subjected to mutually different aligning treatments including no aligning treatment. In a preferred cell structure, a liquid crystal composition lacking a cholesteric phase is disposed between a pair of substrates including one substrate provided with a uniaxially treated alignment control layer 4a and the other substrate provided with a non-uniaxially treated alignment control layer 4b comprising a material identical to or different from a material for the uniaxially treated alignment control layer 4a.

The alignment control layer 4a which has been subjected to a uniaxial aligning treatment comprises a film of an organic polymer, such as polyimide, polyvinyl alcohol, nylon (e.g., 6,6-nylon). The uniaxial aligning treatment may be performed by rubbing the surface of the alignment control layer 4a with a fibrous material such as velvet, cloth or paper, in one direction.

The organic polymer film as the uniaxially treated alignment control layer may preferably comprise a polyimide film, particularly a film of a polyimide having a recurring unit represented by the following formula (P):

Formula (P)

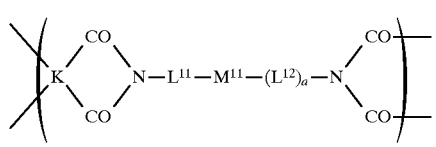

in which

K is

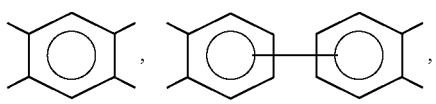

-continued
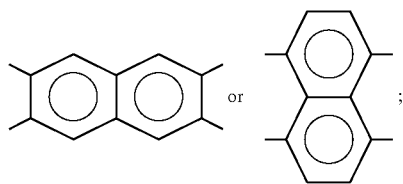
$L^{11}$ and $L^{12}$ independently denote
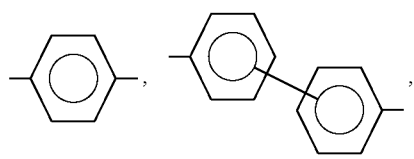
-continued
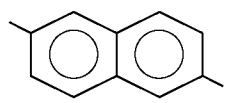
or an alkylene group having 1–20 carbon atoms;
$M^{11}$ is a single bond or —O—; and
a is 0, 1 or 2.
Specific examples of the polyimide of the formula (P) include those having the following recurring units shown below.
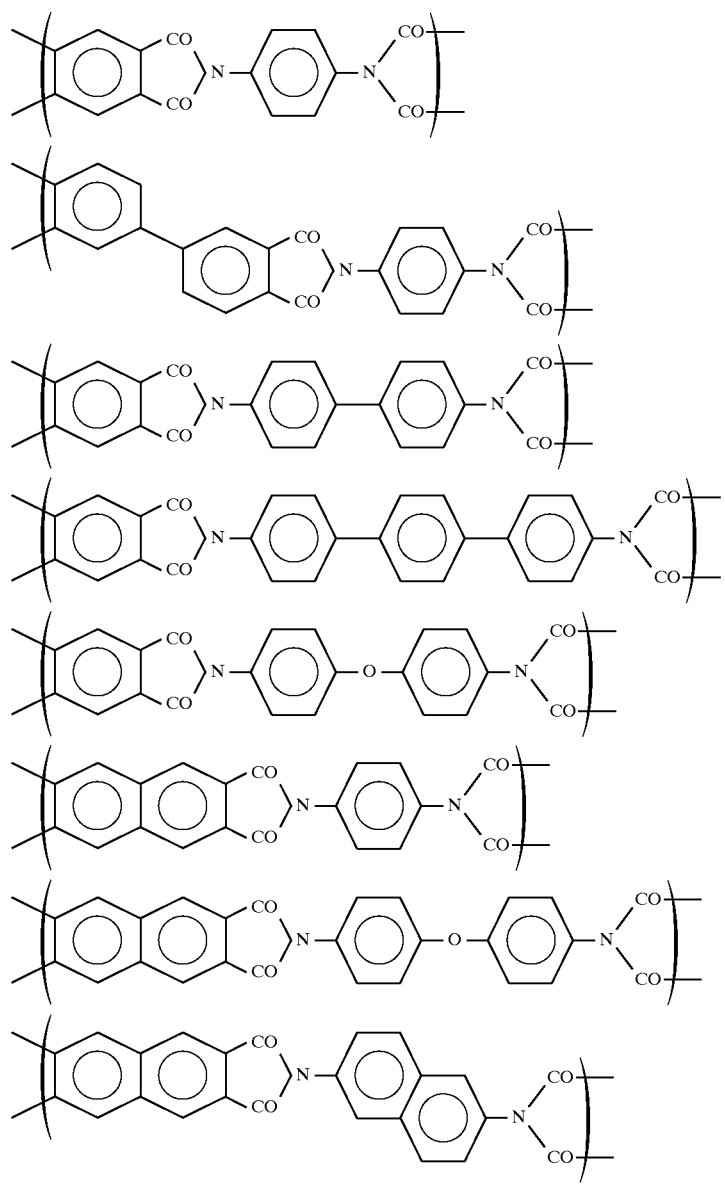

-continued

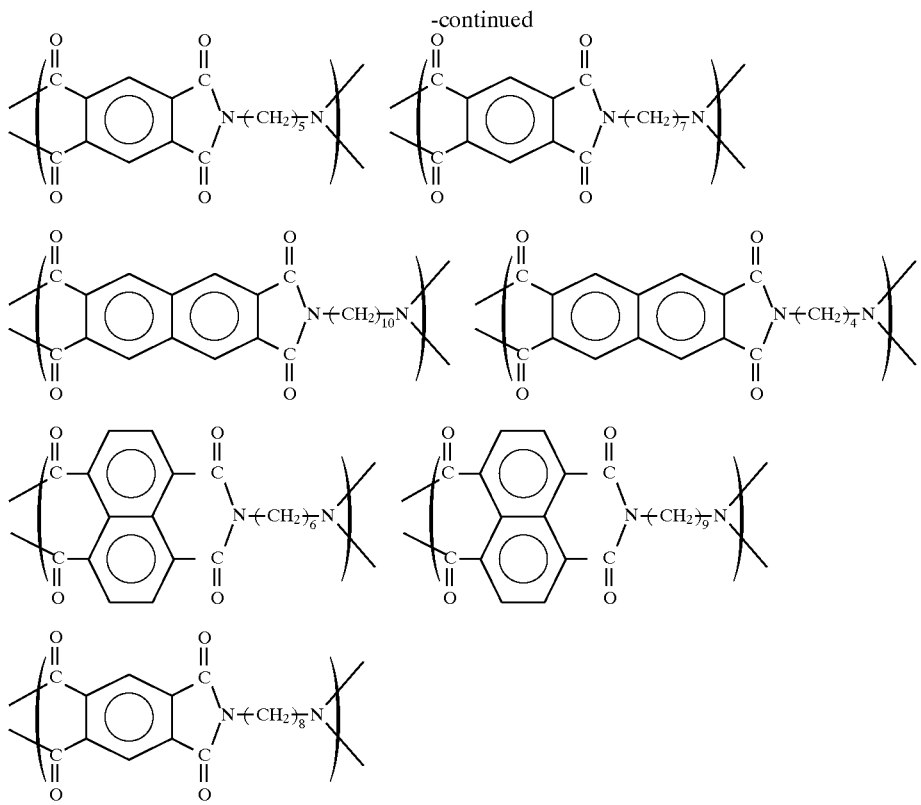

The alignment control layer 4b which has not been subjected to a uniaxial aligning treatment may preferably have a surface energy of at most 35 dyne/cm, particularly at most 30 dyne/cm, and a volume resistivity of $10^4$–$10^8$ ohm.cm. If the surface energy exceeds 35 dyne/cm, the alignment control layer 4b cannot suppress an occurrence of a reverse domain in some cases since its alignment control characteristic and that of the uniaxially treated alignment control layer 4a are liable to be out of balance. If the volume resistivity is out of the range ($10^4$–$10^8$ ohm.cm), it is difficult to maintain a balance of a switching characteristic and a short circuit-preventing effect between a pair of an oppositely disposed substrates (electrodes) in some cases. Examples of a material for the alignment control layer 4b may include a silane coupling agent, a fluorine-containing organic polymer, and a silicone polymer film containing electroconductive particles dispersed therein. Such a material may be the above-described organic polymer.

The alignment control layer 4b may preferably include a silane coupling agent film, an insulating polymer film and a film comprising a matrix material containing oxide fine particles dispersed therein and doped with an electroconductivity-controlling impurity, as desired. Specific examples of the oxide may include those containing group II elements, such as ZnO, CdO, and ZnCdOx; and those containing group IV elements, such as $GeO_2$, $SnO_2$, GeSnOx, $TiO_2$, $ZrO_2$ and TiZiOx. Specific examples of the electroconductivity-controlling impurity may include: an n-type impurity of group III elements, such as B, Al, Ga and In, and a p-type impurity of group I element, such as Cu, Ag, Au and Li, each for the oxides of group II elements described above; and an n-type impurity of group V element, such as P, As, Sb and Bi, and a p-type impurity of group III element, such as B, Cl, Ga and In, each for the oxides of group IV elements described above. Particularly, preferred examples of the film may include a wet coating-type film comprising matrix material, such as silica or siloxane polymer, containing, e.g., dispersed $SnO_2$ fine particles doped with, e.g., Sb.

In the present invention, a combination of the alignment control layer 4a comprising a uniaxial aligning-treated polyimide film and the alignment control layer 4b comprising a (coating-type) film wherein oxide fine particles (doped with an electroconductivity-controlling impurity) are uniformly dispersed in a matrix material as described above may preferably adopted.

The spacer beads as a spacer member 5 used in the present invention is surface-treated with a material constituting the alignment control layer 4b which has not been subjected a uniaxial aligning treatment. Examples of the spacer beads 5 may include silica beads, alumina beads and resinous beads. The spacer member 5 may be a fiber-shaped material.

The spacer 5 may be appropriately selected in view of a given cell gap but may preferably have an average diameter (short axis length for the fiber-shaped material) of 1–5 μm, e.g., in order to suppress a formation of a helical structure intrinsic to a chiral smectic liquid crystal if it is used. The spacer member 5 may preferably have a dispersion density of 100–500 particles/$mm^2$ but the dispersion density may vary depending on a panel (cell) size.

The surface treatment of the spacer member 5 (preferably spacer beads) may be performed by applying a dispersion or solution of, e.g., a coupling agent or a surfactant capable of constituting the alignment control layer 4b in an appropriate solvent onto the surface of the spacer member or by forming a layer (shell) having a small surface energy around silica beads (cone) to provide beads of a core-shell type. As a more simple method therefor, spacer beads may be dispersed in a solution of a material for the alignment control layer 4b (which is not uniaxially aligning-treated) in advance and a resultant dispersion is applied onto an objective substance, whereby it is possible to effect the formation of the alignment control layer 4b and the dispersion (and surface treatment) of the spacer member 5 at the same time. Further, the surface treatment may also be performed by spraying a material for the alignment control layer 4b on the spacer member 5 formed in advance dispersed on the surface of the alignment control layer 4b.

In the liquid crystal device of the present invention, a switching signal from a signal power supply (not shown) is applied to the liquid crystal layer 1 to effect switching. As a result, the liquid crystal device functions as a light valve for a display device. Further, in case where two groups of electrodes 3 are arranged in matrix (so as to intersect with each other, e.g., at right angles) on the pair of substrates, it is possible to perform pattern display and pattern exposure, so that the liquid crystal device is used as light valves for a personal computer, a word processor, and a printer.

Hereinbelow, the alignment defects of chiral smectic liquid crystal molecules and a method for suppressing the alignment defects will be described with reference to FIGS. 2–4.

Figure 2:
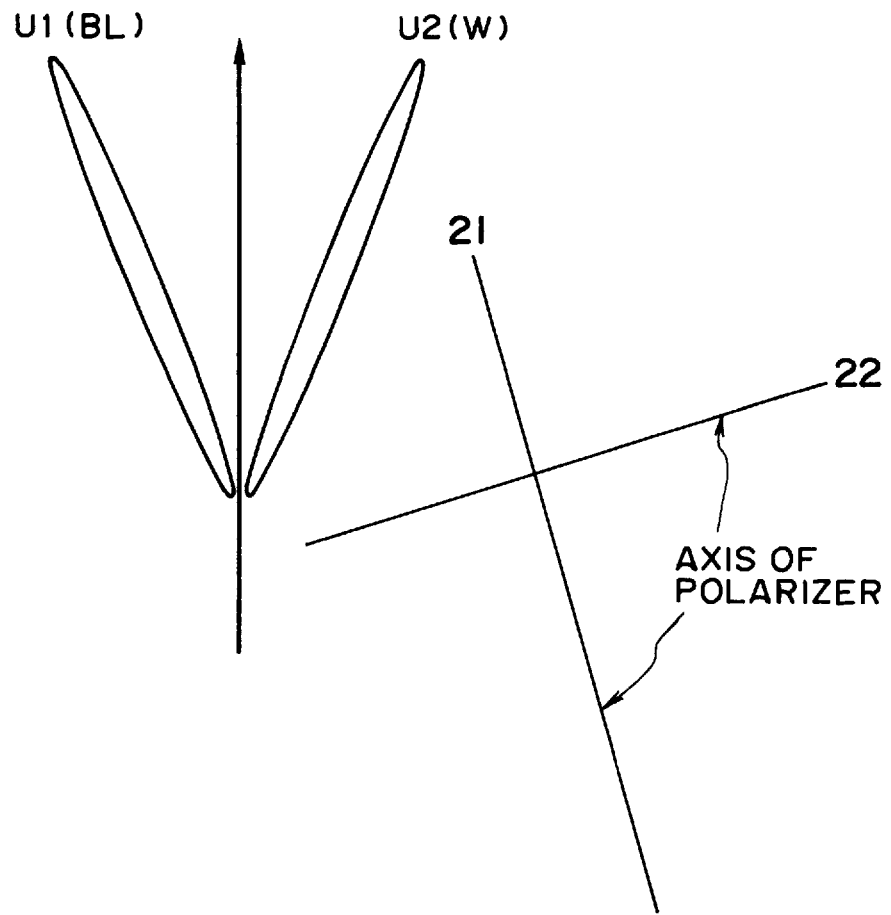
FIG. 2 is a schematic view for illustrating a bistability of liquid crystal molecules.

FIG. 2 shows a relationship between molecular positions of the liquid crystal molecules and an arrangement of pair of polarizers (8 in FIG. 1) provided with optical axes 21 and 22. Referring to FIG. 2, molecular positions U1 and U2 correspond to the stable states (bistable state) of the chiral smectic liquid crystal and, in this embodiment, provide a black (BL) state and a white (W) state, respectively.

FIG. 3 shows a smectic layer structure in the vicinity of a typical alignment defect.

A layer structure 31 at a defective portion has a deviation angle θ of a layer normal (an angle formed between the layer normal at the defective portion and the layer normal at an indefective portion constituting a layer structure 32, i.e., corr. to an angle formed between layer extension lines at the defective and indefective portions).

The layer structures 31 and 32 are connected with each other by a gentle curve in some cases. The layer structure 31 constituting the alignment defect generally includes different four layer structure sections 31-a, 31-b, 31-c and 31-d each providing a different extension direction of a layer normal. The layer structure 31 can occur in succession.

Figures 4A, 4B:
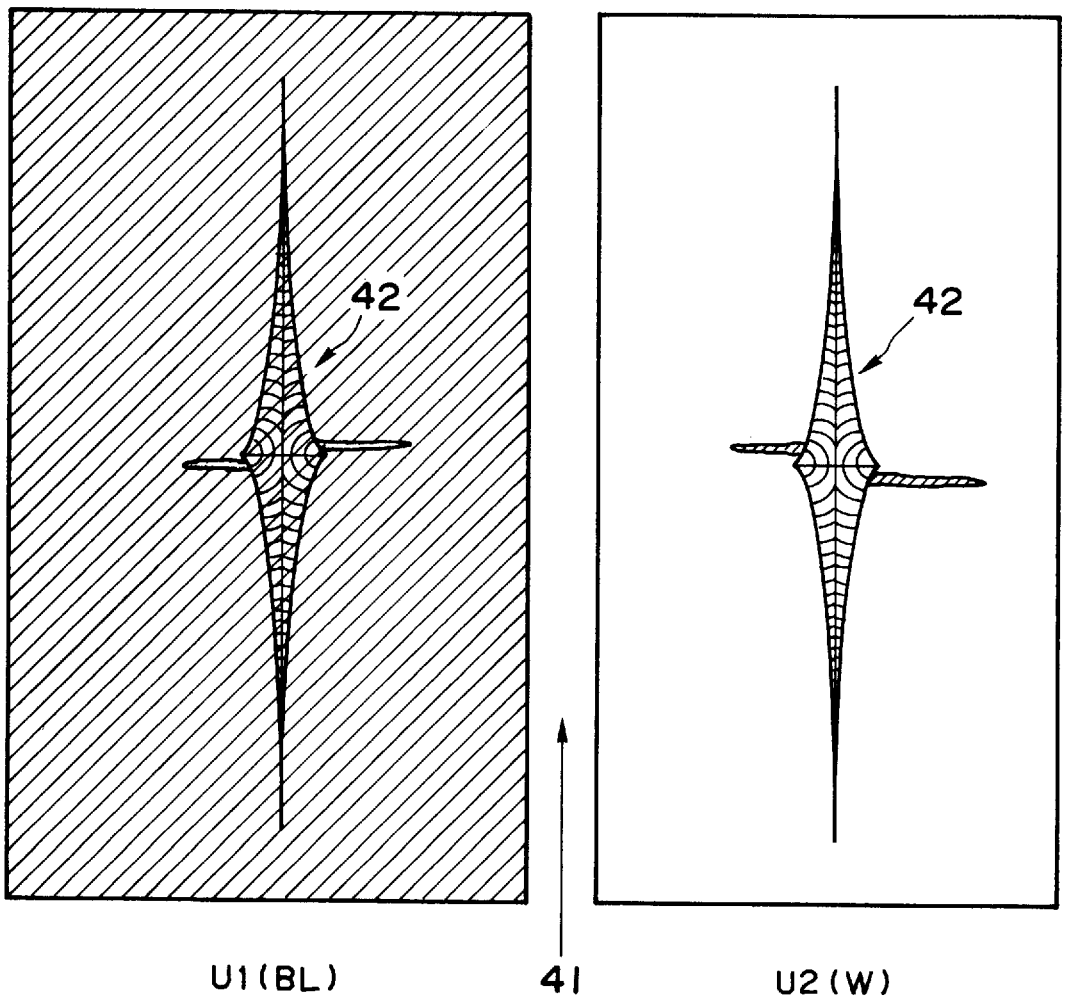
FIGS. 4A and 4B are respectively a view for illustrating a relationship between a reverse domain and an alignment defect.

FIGS. 4A and 4B are schematic plan views each representing a positional relationship between the alignment defect and a reverse domain relative to an average layer normal direction 41 of smectic layers. In the alignment defect 42, the smectic layer structure (e.g., 31 in FIG. 3) is distorted when compared with a surrounding ordinary (normal) portion (e.g., 32 in FIG. 3) as shown in FIGS. 4A and 4B. Referring again to FIG. 3 in combination with FIGS. 4A and 4B, when a liquid crystal-molecular position U1 (providing the darkest (BL) state) is selected (or written) as shown in FIG. 4A, a domain (a reverse domain as represented by two white elongated regions perpendicular to the layer normal direction 41) in a liquid crystal-molecular position U2 (providing the brightest (W) state) is generated from the above-described layer structure sections 31-b and 31-c (FIG. 3) wherein the layer normal extension direction is largely inclined counterclockwise based on the layer normal direction 41. On the other hand, when the molecular position U2 (W) is selected as shown in FIG. 4B, a domain (a reverse domain as represented by two black elongated regions perpendicular to the layer normal direction 41) in the molecular position U1 (BL) is generated from the layer structure sections 31-a and 31-d (FIG. 3) wherein the layer normal extension direction is largely inclined clockwise based on the layer normal direction 41.

These phenomena may be attributable to an instability of a memory state resulting from the deviation of the layer normal extension direction in the alignment defect 42. More specifically, in the alignment defect 42 as shown in FIGS. 4A and 4B, respective layer normal extension directions are deviated from a uniaxial aligning axis direction (e.g., rubbing direction) of one of a pair of substrates to break bistability of a liquid crystal. In this instance, e.g., when a data signal (pulse) is applied to the liquid crystal layer in a matrix-addressed driving scheme, liquid crystal molecules fail to maintain a memory state due to vibration thereof caused by the data signal application, thus causing an occurrence of a reverse domain. The reverse domain repeat an increase and a decrease depending on a writing frequency, whereby an occurrence of flickering and a lowering in contrast are induced.

As described above, the number and the size of the alignment defect resulting from alignment control layers can be decreased by appropriately controlling the alignment control layers, e.g., by providing only one alignment control layer with a uniaxial aligning axis and lowering a surface energy of the other alignment control layer. However, the spacer member (5 in FIG. 1) disposed between the alignment control layers can cause the alignment defect. Accordingly, in order to further effectively suppress an occurrence of a reverse domain, it is necessary to minimize the alignment defect resulting from the spacer member. In the present invention, the spacer member is surface-treated by a material constituting an alignment control layer which has not been subjected to a uniaxial aligning treatment, e.g., by a material allowing a lowering in surface energy, thus effectively decreasing the size of the alignment defect to suppress an occurrence of the reverse domain.

Then, another structural embodiment of the liquid crystal device of the present invention will be specifically explained with reference to FIG. 5.

Figure 5:
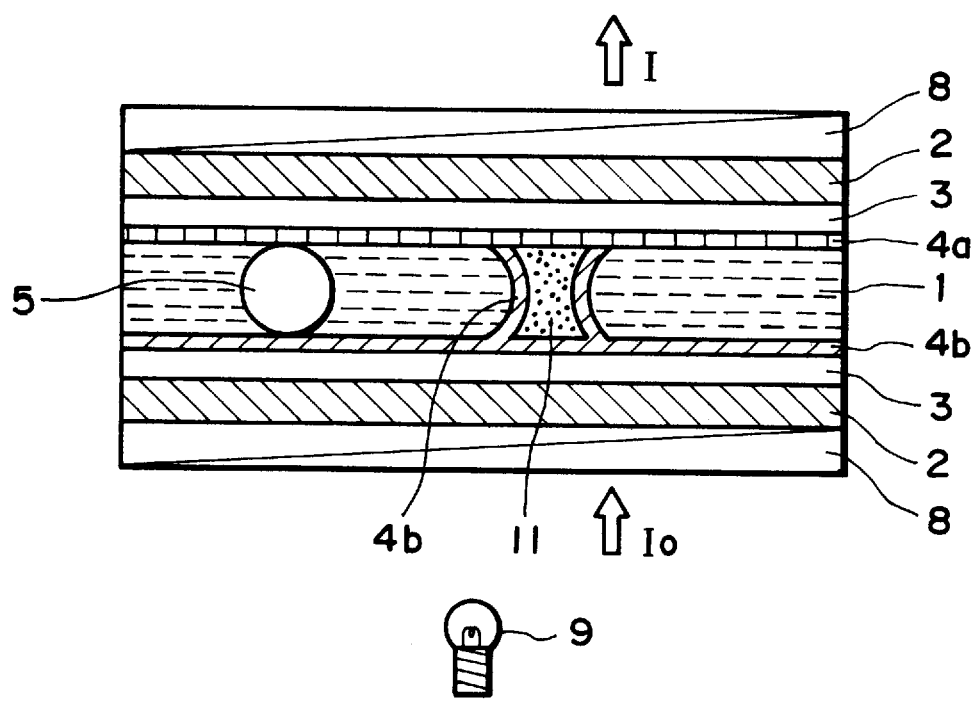
FIG. 5 is a schematic sectional view of another embodiment of a liquid crystal device of the present invention.

Referring to FIG. 5, respective structural members represented by respective reference numerals are identical to those represented by identical reference numerals in FIG. 1. In this embodiment (FIG. 5), a sealing member (10 in FIG. 1) is used but is omitted on the drawing.

The liquid crystal device shown in FIG. 5 includes an adhesive 11 dispersed together with a spacer member 5 between a pair of substrates 2 while contacting alignment control layers 4a and 4b. The adhesive 11 is surface-treated with a material constituting the alignment control layer 4b. The adhesive 11 may preferably a particle-shaped adhesive (adhesive particles), specific examples of which may include particles of resins, such as a thermosetting resin (e.g., epoxy resin or polyimide resin) and a thermoplastic resin (e.g., nylon).

The surface treatment of the adhesive 11 may be performed in the same manner as in the spacer member 5. For example, when the alignment control layer 4b is formed on the substrate 2, adhesive particles are dispersed and mixed in a coating solution in an appropriate solvent of a material for the alignment control layer 4b and a resultant coating liquid is applied onto the objective substrate 2 to effect surface treatment of the adhesive particles simultaneously with the formation of the alignment control layer 4b. Alternatively, adhesive particles are dispersed on an objective substrate which has not been coated with the alignment control layer 4b and thereon, a material for the alignment control layer is applied by, e.g., coating. In FIG. 5, the thus prepared adhesive 11 coated with the material for the alignment control layer 4b is shown.

In case where the adhesive comprises adhesive particles (a particle-shaped adhesive), the adhesive particles may preferably have a particle size being 2–5 times as large as a cell gap in view of an adhesive strength between the pair of substrates varying depending on a given cell gap and a panel size. The adhesive particles may preferably be dispersed at a dispersion density of 10–300 particles/mm$^2$.

In case where a chiral smectic liquid crystal is used, it is preferred to use the spacer member 5 and the adhesive 11 dispersed in combination between in the substrates 2 as shown in FIG. 5 in order to improve, e.g., a shock (impact) resistance. In this instance, both the adhesive 11 and the spacer member 5 may preferably be surface-treated by the material for the alignment control layer 4b not subjected to a uniaxial aligning treatment.

In a liquid crystal device (cell) using a chiral smectic liquid crystal lacking a cholesteric phase, when batonnets of smectic A (SmA) phase are generated and joined to each other in a phase transition from isotropic (Iso) phase to SmA phase, the alignment defect as described above is caused. At this time, if an adhesive is dispersed and present between a pair of substrates, the adhesive becomes nucleus (core) of the alignment defect similarly as in that due to the spacer member as described above with reference to FIGS. 2, 3, 4A and 4B. This alignment defect may be attributable to a strong aligning-control force to liquid crystal molecules at the surface of the adhesive dispersed in the liquid crystal layer. In the above embodiment shown in FIG. 5, an unnecessary aligning-control force to liquid crystal molecules at the adhesive surface is weakened or removed by surface-treating the adhesive 11 with the material for the alignment control layer 4b, whereby a distortion (or strain) at the time of batonnets' growth (generation and joint thereof) is decreased. As a result, an occurrence of the alignment defect is suppressed.

In the liquid crystal devices of the present invention, the liquid crystal layer 1 (in FIGS. 1 and 5) may preferably comprise a chiral smectic liquid crystal composition particularly having ferroelectricity and lacking a cholesteric phase on temperature decrease.

The chiral smectic liquid crystal composition may desirably contain at least one species of a fluorine-containing mesomorphic compound which preferably has a structure including a fluorocarbon terminal portion and a hydrocarbon terminal portion connected by a central core and has smectic phase or latent smectic phase. This is because such a chiral smectic liquid crystal composition is effective in improving a contract when a resultant liquid crystal device is driven and particularly is effective in readily providing a bookshelf structure or a structure closer thereto having a small layer inclination angle within the device.

The term "latent smectic phase" refers to a property of a compound concerned that the compound alone does not exhibit smectic phase but can be a component compatibly contained in smectic phase of a liquid crystal composition.

In the fluorine-containing mesomorphic compound used in the present invention, the mesomorphic compound may preferably have a central core comprising at least two rings independently selected from aromatic, heteroaromatic, cycloaliphatic, substituted aromatic, substituted heteroaromatic, or substituted cycloaliphatic rings, which may be connected one with another by means of functional groups selected from —COO—, —COS—, —HC=N—, —COSe—. Rings may be fused or non-fused. Heteroatoms within the heteroaromatic ring comprise at least one atom selected from N, O or S. Non-adjacent methylene groups in cycloaliphatic rings may be substituted by O atom.

In a preferred class of the fluorine-containing mesomorphic compound, the fluorocarbon terminal portion may preferably be:

a group (perfluoroalkyl-type terminal portion) represented by the formula —D$^1$—C$_{xa}$F$_{2xa}$—X, where xa is 1–20; X is —H or —F; —D$^1$— is —CO—O—(CH$_2$)$_{ra}$—,
—O—(CH$_2$)$_{ra}$—, —(CH$_2$)$_{ra}$—, —O—SO$_2$—, —SO$_2$—, —SO$_2$—(CH$_2$)$_{ra}$—, —O—(CH$_2$)$_{ra}$—O—(CH$_2$)$_{rb}$—, —(CH$_2$)$_{ra}$—N(C$_{pa}$H$_{2pa+1}$)—SO$_2$— or —(CH$_2$)$_{ra}$—N(C$_{pa}$H$_{2pa+1}$)—CO—; where ra and rb are independently 1–20; and pa is 0–4; or a group (perfluoroalkyl ether-type terminal portion) represented by —D$^2$—(C$_{xb}$F$_{2xb}$—O)$_{za}$—C$_{ya}$F$_{2ya+1}$, wherein xb is 1–10 independently for each (C$_{xb}$F$_{2xb}$—O); ya is 1–10; za is 1–10; —D$^2$— is —CO—O—C$_{rc}$H$_{2rc}$—, —O—C$_{rc}$H$_{2rc}$——C$_{rc}$H$_{2rc}$—, —O—(C$_{sa}$H$_{2sa}$—O)$_{ta}$—C$_{rd}$H$_{2rd}$—, —O—SO$_2$—, —SO$_2$—, —SO$_2$—C$_{rc}$H$_{2rc}$—, —C$_{rc}$H$_{2rc}$—N(C$_{pb}$H$_{2pb+1}$)—SO$_2$—, —C$_{rc}$H$_{2rc}$—N(C$_{pb}$H$_{2pb+1}$)—CO—, or a covalent bond, where rc and rd are independently 1–20; sa is independently 1–10 for each (C$_{sa}$H$_{2sa}$—O); ta is 1–6; and pb is 0–4.

It is particularly preferred to use a fluorine-containing mesomorphic compound of the following general formula (I) or general formula (II):

Formula (I)

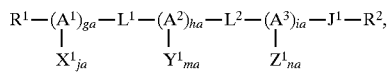

wherein A$^1$, A$^2$ and A$^3$ are each independently

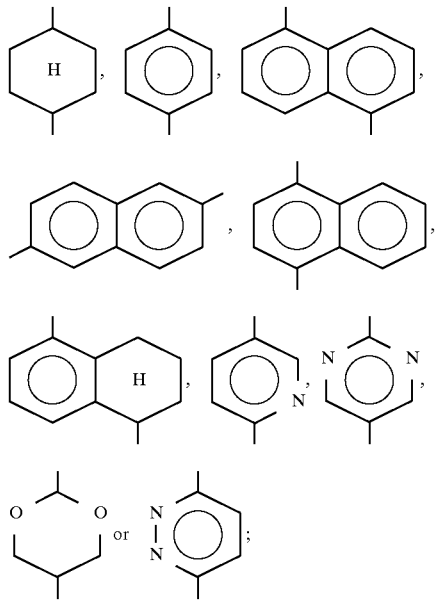

ga, ha and ia are independently an integer of 0–3 with the proviso that the sum of ga+ha+ia be at least 2;

L$^1$ and L$^2$ are each independently a covalent bond, —CO—O—, —O—CO—, —COS—, —S—CO—, —CO—Se—, —Se—CO—, —CO—Te—, —Te—CO—, —CH$_2$CH$_2$—, —CH=CH—, —C=C—, —CH=N—, —N=CH—, —CH$_2$—O—, —O—CH$_2$—, —CO— or —O—;

X$^1$, Y$^1$ and Z$^1$ are each a substituent of A$^1$, A$^2$ and A$^3$, respectively, and each X$^1$, Y$^1$ and Z$^1$ are independently —H, —Cl, —F, —Br, —I, —OH, —OCH$_3$, —CH$_3$, —CN or —NO$_2$;

each ja, ma and na are independently an integer of 0–4;

J$^1$ is —CO—O—(CH$_2$)$_{ra}$—, —O—(CH$_2$)$_{ra}$—, —(CH$_2$)$_{ra}$—, —O—SO$_2$—, —SO$_2$—, —SO$_2$—(CH$_2$)$_{ra}$—, —O—(CH$_2$)$_{ra}$—O—(CH$_2$)$_{rb}$—, —(CH$_2$)$_{ra}$—N(C$_{pa}$H$_{2pa+1}$)—SO$_2$— or —(CH$_2$)$_{ra}$—N(C$_{pa}$H$_{2pa+1}$)—CO—; where ra and rb are independently 1–20, and pa is 0–4;

$R^1$ is —O—$C_{qa}H_{2qa}$—O—$C_{qb}H_{2qb+1}$, —$C_{qa}H_{2qa}$—O—$C_{qb}H_{2qb+1}$, —$C_{qa}H_{2qa}$—$R^3$, —O—$C_{qa}H_{21qa}$—$R^3$, —CO—O—$C_{qa}H_{2qa}$—$R^3$, or —O—CO—$C_{qa}H_{2qa}$—$R^3$ which may be either straight chain or branched; where $R^3$ is —O—CO—$C_{qb}H_{2qb+1}$, —CO—O—$C_{qb}H_{2qb+1}$, —H, —Cl, —F, —$CF_3$, —$NO_2$ or —CN; and qa and qb are independently 1–20;

$R^2$ is $C_{xa}F_{2xa}$—X, where X is —H or —F, xa is an integer of 1–20.

Formula (II)

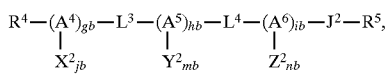

wherein $A^4$, $A^5$ and $A^6$ are each independently

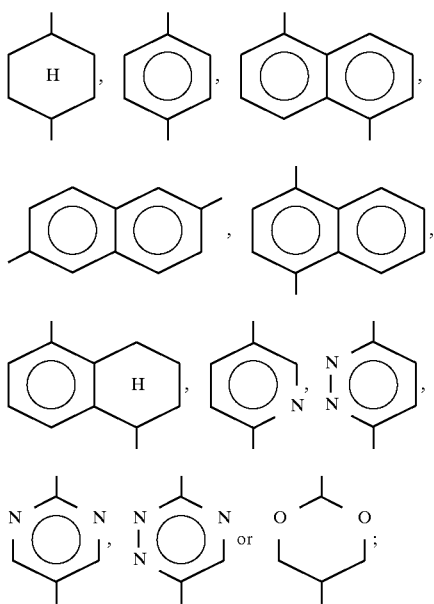

gb, hb and ib are each independently an integer of 0–3 with the proviso that the sum of gb+hb+ib be at least 2;

each $L^3$ and $L^4$ are independently a covalent bond, —CO—O—, —O—CO—, —CO—S—, —S—CO—, —CO—Se—, —Se—CO—, —CO—Te—, —Te—CO—, —($CH_2CH_2$)$_{ka}$—(ka is 1–4), —CH=CH—, —C≡C—, —CH=N—, —N=CH—, —$CH_2$—O—, —O—$CH_2$—, —CO— or —O—;

$X^2$, $Y^2$ and $Z^2$ are each a substituent of $A^4$, $A^5$ and $A^6$, respectively, and each $X_2$, $Y_2$ and $Z_2$ are independently —H, —Cl, —F, —Br, —I, —OH, —$OCH_3$, —$CH_3$, —$CF_3$, —O—$CF_3$, —CN or —$NO_2$; each jb, mb and nb are independently an integer of 0–4;

$J^2$ is —CO—O—$C_{rc}H_{2rc}$—, —O—$C_{rc}H_{2rc}$—, —$C_{rc}H_{2rc}$—, —O—($C_{sa}H_{2sa}$—O)$_{ta}$—$C_{rd}H_{2rd}$—, —O—$SO_2$—, —$SO_2$—, —$SO_2$—$C_{rc}H_{2rc}$—, —$C_{rc}H_{2rc}$—N($C_{pb}H_{2pb+1}$)—$SO_2$— or —$C_{rc}H_{2rc}$—N($C_{2pb}H_{2pb+1}$)—CO—; rc and rd are independently 1–20; sa is independently 1–10 for each ($C_{sa}H_{2sa}$—O), ta is 1–6; pb is 0–4;

$R^4$ is —O—($C_{qc}H_{2qc}$—O)$_{wa}$—$C_{qd}H_{2qd+1}$, —($C_{qc}H_{2qc}$—O)$_{wa}$—$C_{qd}H_{2qd+1}$, —$C_{qc}H_{2qc}$—$R^6$, —O—$C_{qc}H_{2qc}$—$R^6$, —CO—O—$C_{qc}H_{2qc}$—$R^6$, or O—CO—$C_{qc}H_{2qc}$—$R^6$ which may be either straight chain or branched; $R^6$ is —O—CO—$C_{qd}H_{2qd+1}$; —CO—O—$C_{qd}H_{2qd+1}$, —Cl, —F, —$CF_3$, —$NO_2$, —CN or —H; qc and qd are independently an integer of 1–20; wa is an integer of 1–10;

$R^5$ is ($C_{xb}F_{2xb}$—O)$_{za}$—$C_{ya}F_{2ya+1}$, wherein xb is independently 1–10 for each ($C_{xb}F_{2xb}$—O); ya is 1–10; and za is 1–10.

The compounds represented by the general formula (I) may be obtained through a process described in U.S. Pat. No. 5,082,587 (corr. to JP-A 2-142753). Specific examples thereof are enumerated below.

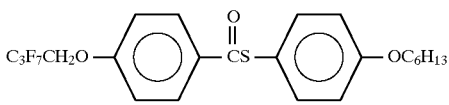

I-1

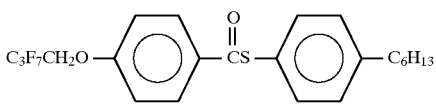

I-2

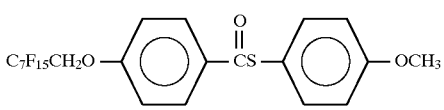

I-3

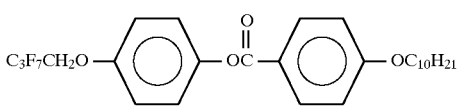

I-4

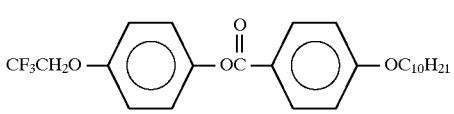

I-5

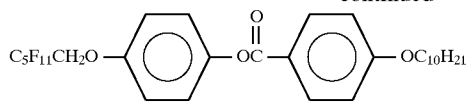
I-6
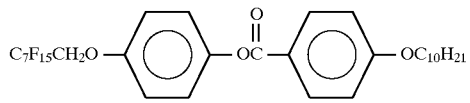
I-7
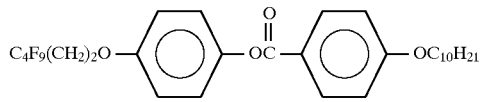
I-8
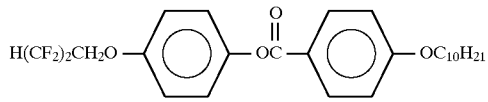
I-9
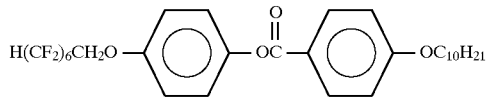
I-10
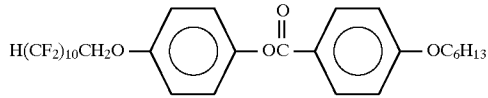
I-11
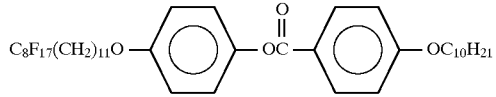
I-12
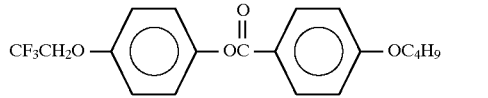
I-13
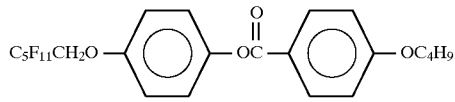
I-14
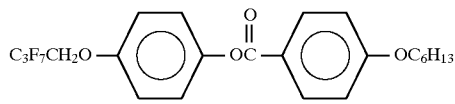
I-15
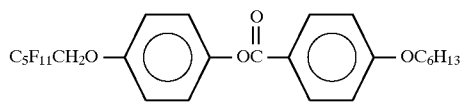
I-16
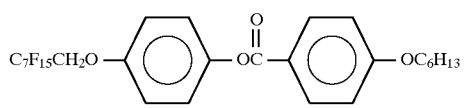
I-17
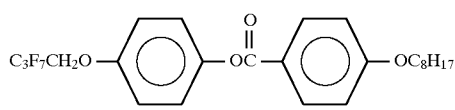
I-18
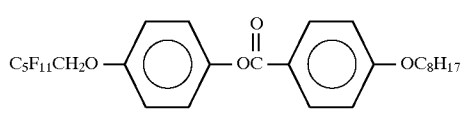
I-19

-continued
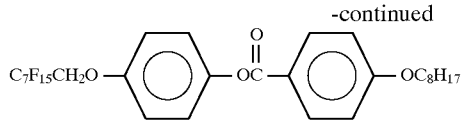 I-20
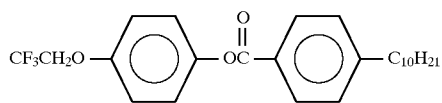 I-21
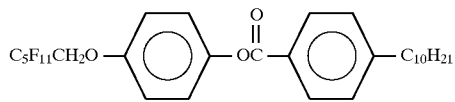 I-22
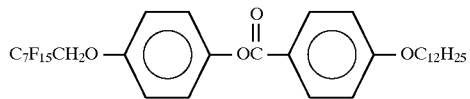 I-23
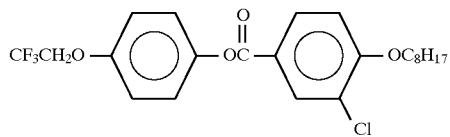 I-24
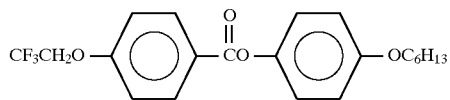 I-25
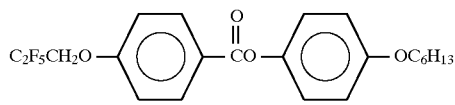 I-26
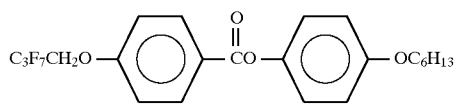 I-27
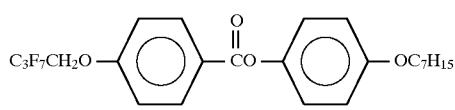 I-28
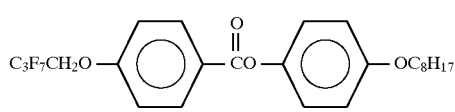 I-29
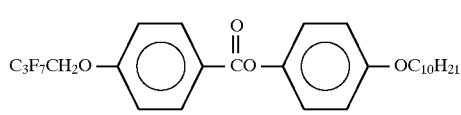 I-30
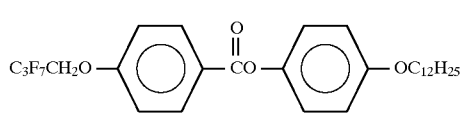 I-31
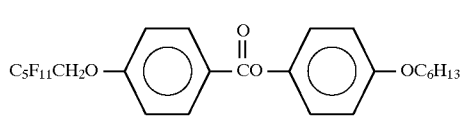 I-32
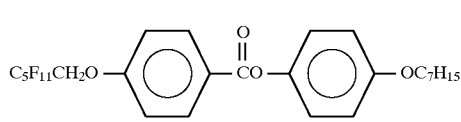 I-33

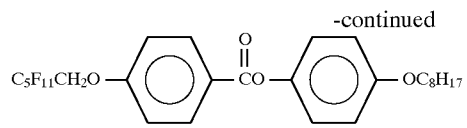
I-34
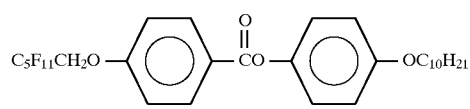
I-35
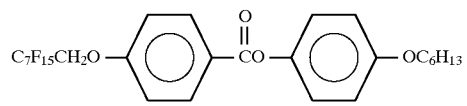
I-36
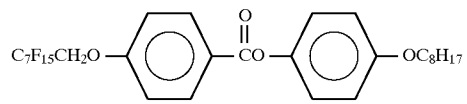
I-37
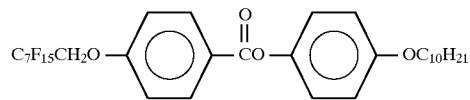
I-38
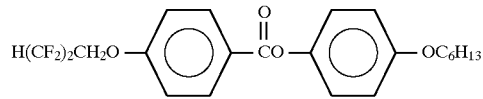
I-39
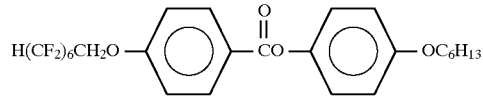
I-40
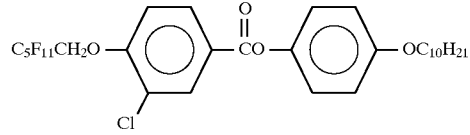
I-41
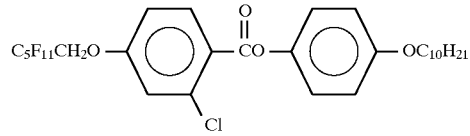
I-42
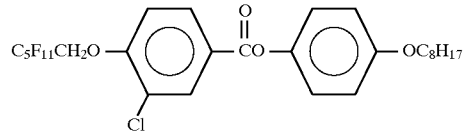
I-43
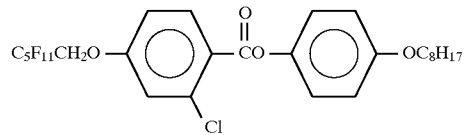
I-44
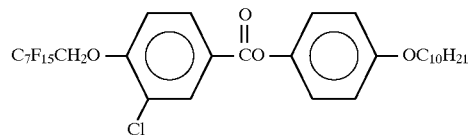
I-45
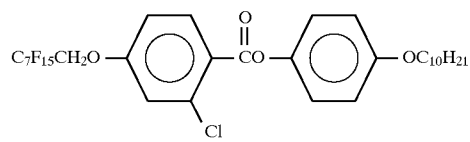
I-46

-continued
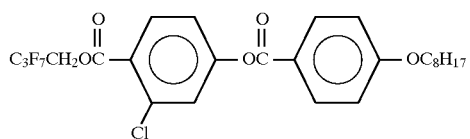 I-47
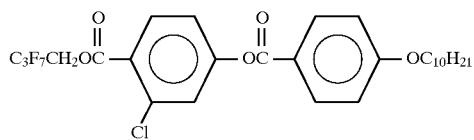 I-48
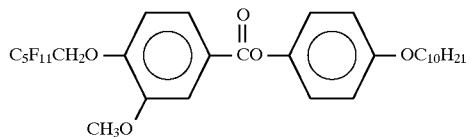 I-49
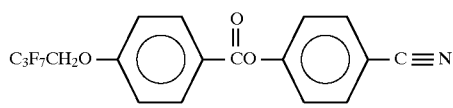 I-50
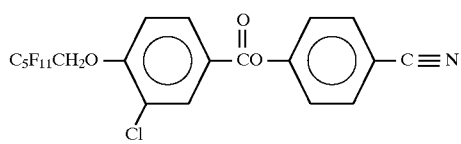 I-51
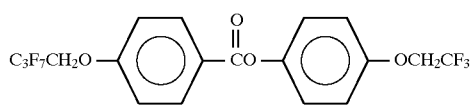 I-52
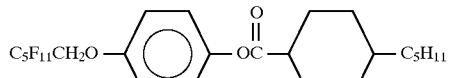 I-53
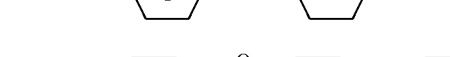 I-54
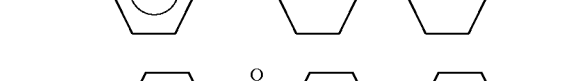 I-55
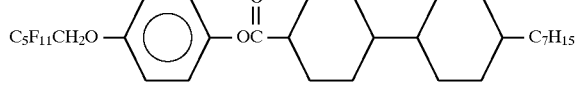 I-56
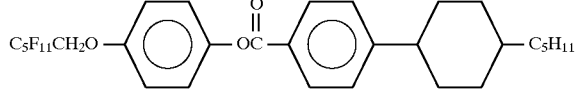 I-57
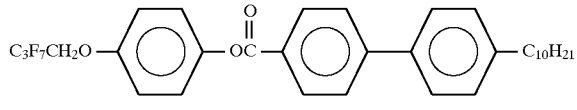 I-58
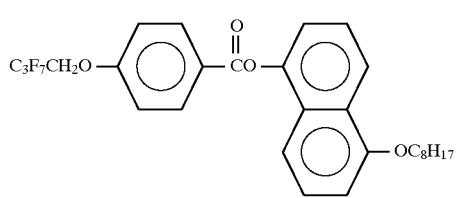

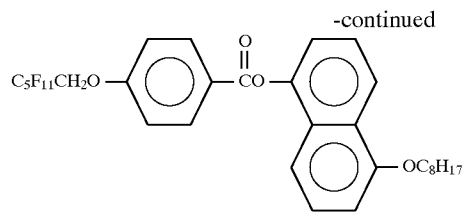
I-59
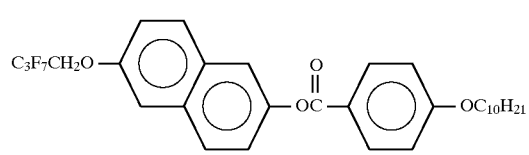
I-60
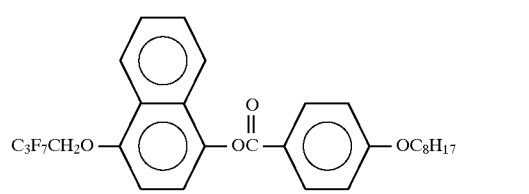
I-61
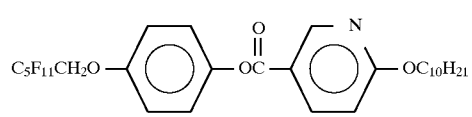
I-62
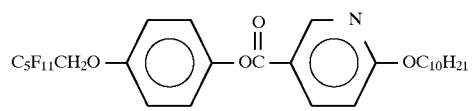
I-63
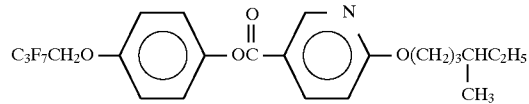
I-64
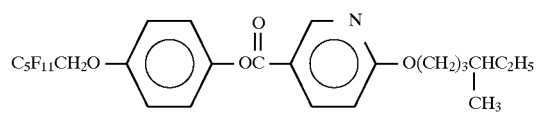
I-65
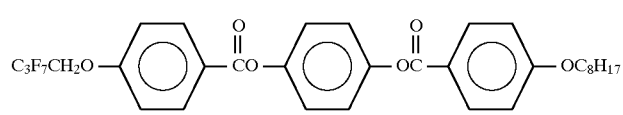
I-66
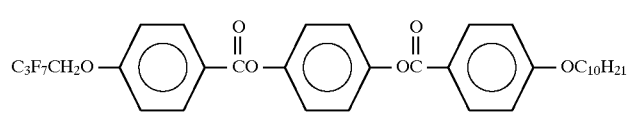
I-67
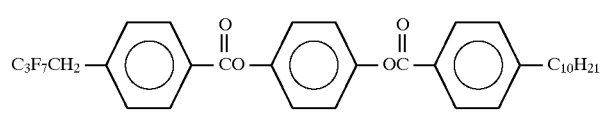
I-68
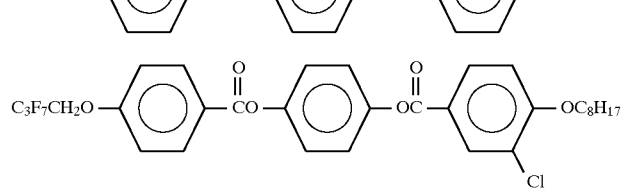
I-69
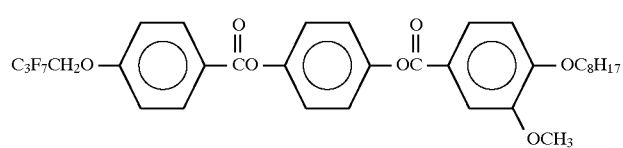
I-70
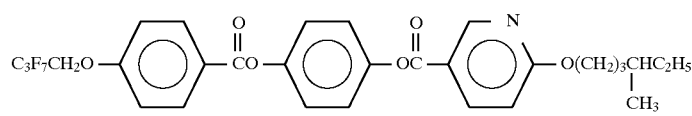

-continued
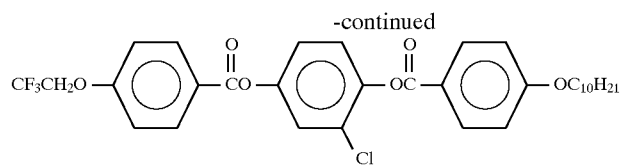 I-71
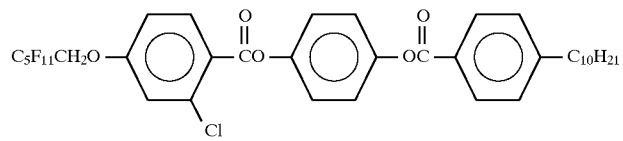 I-72
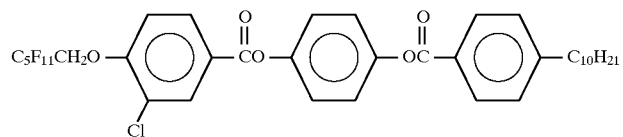 I-73
 I-74
 I-75
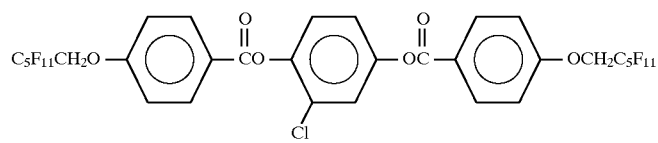 I-76
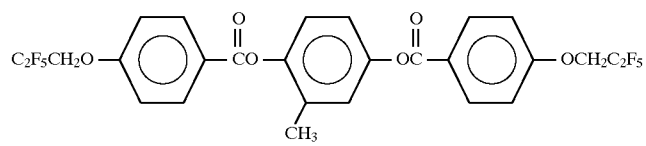 I-77
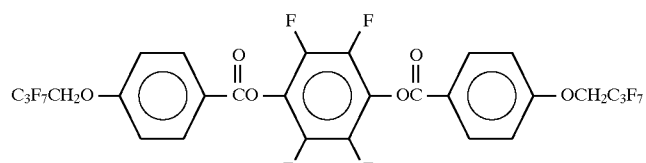 I-78
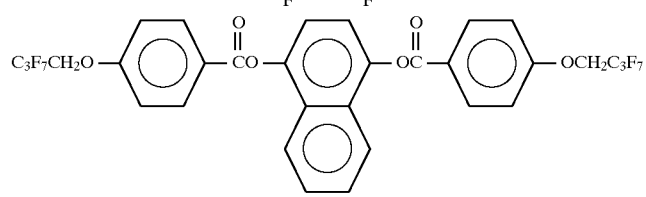 I-79
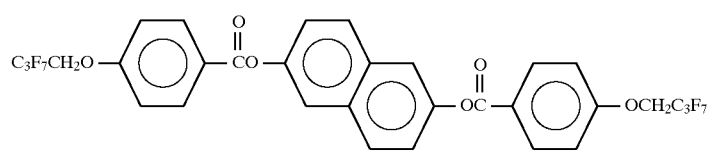 I-80
 I-81

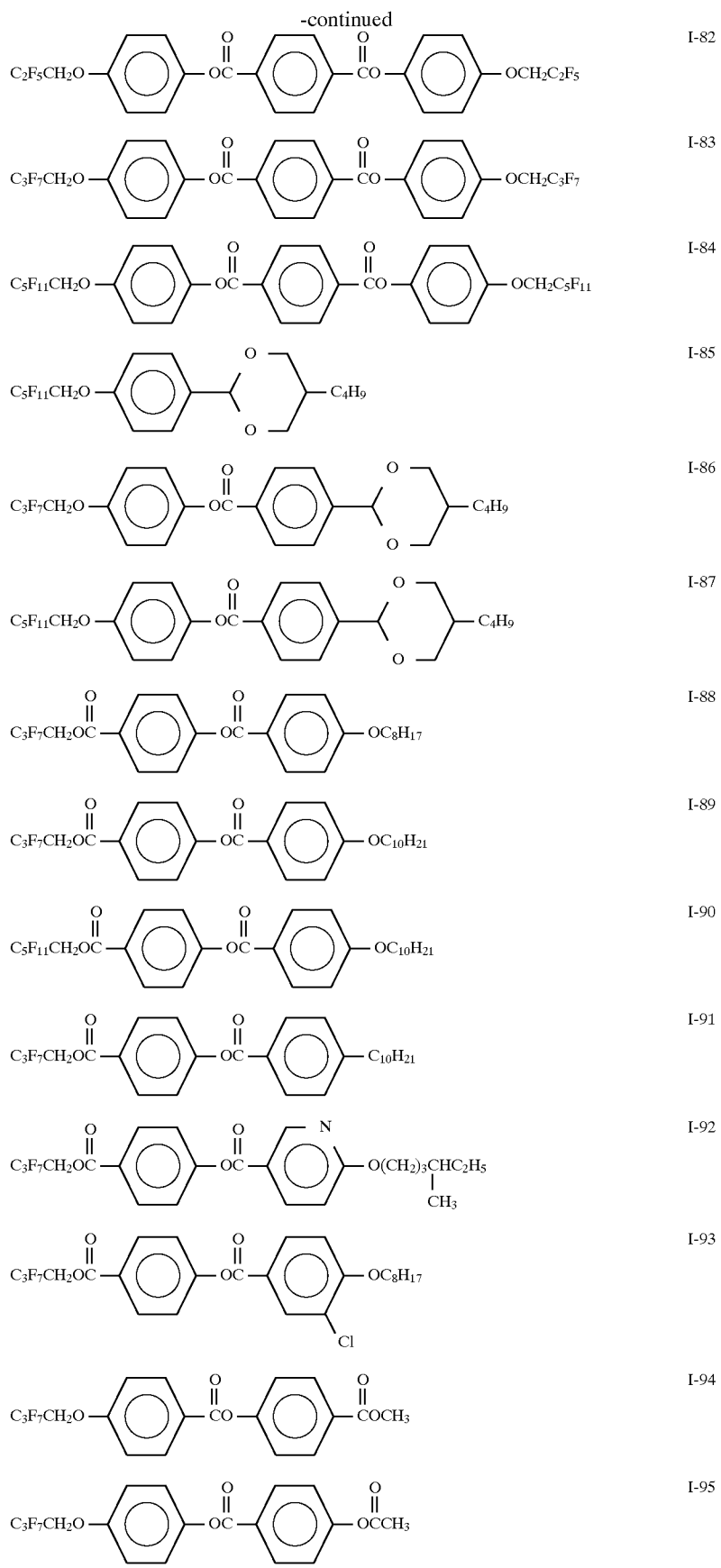

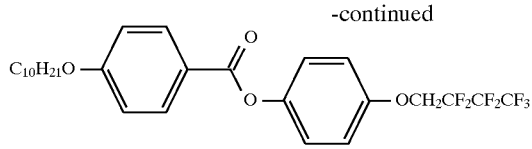
I-96
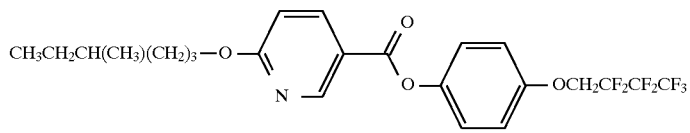
I-97
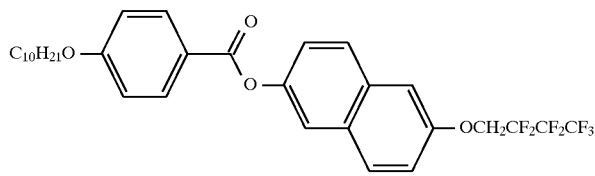
I-98
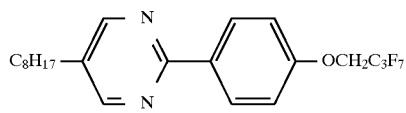
I-99
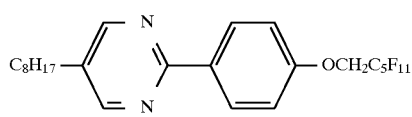
I-100
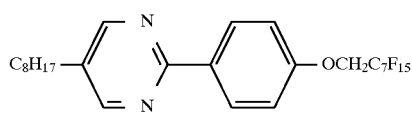
I-101
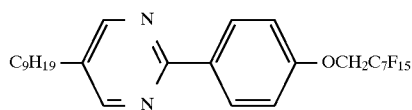
I-102
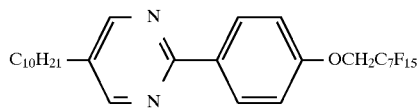
I-103
The compounds represented by the general formula (II) may be obtained though a process described in PCT Publication WO93/22396 (corr. to JP (Tokuhyo) 7-506368). Specific examples thereof are enumerated below.
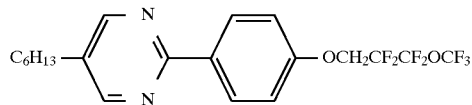
II-1
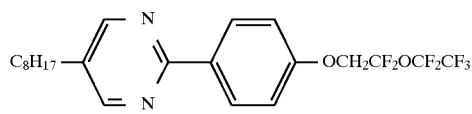
II-2
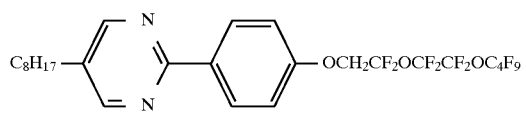
II-3
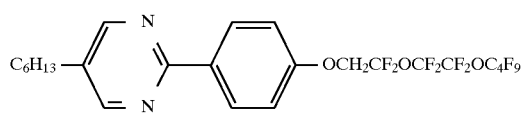
II-4

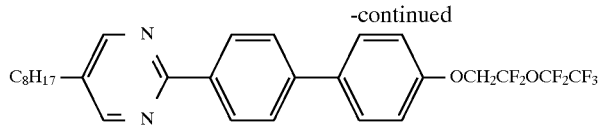
II-5
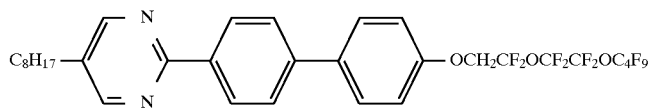
II-6
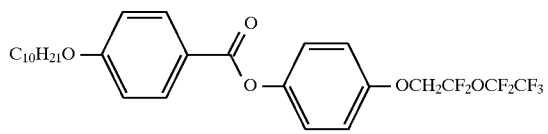
II-7
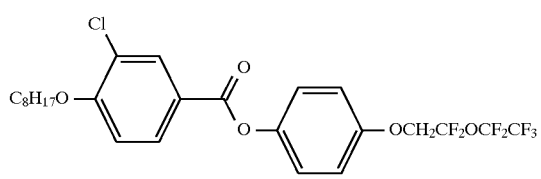
II-8
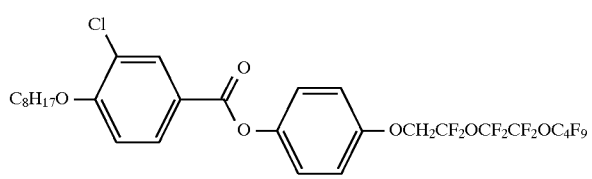
II-9
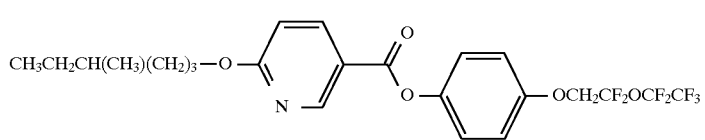
II-10
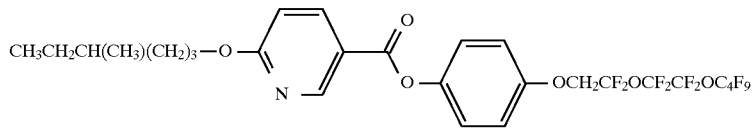
II-11
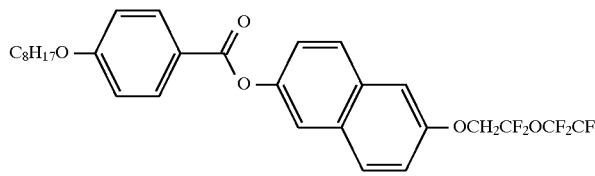
II-12
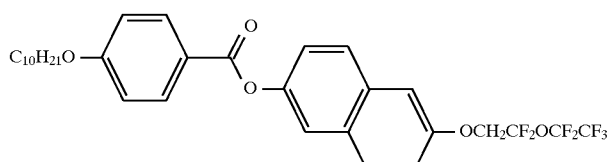
II-13
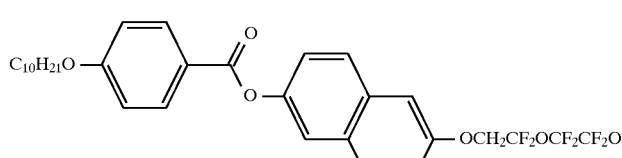
II-14
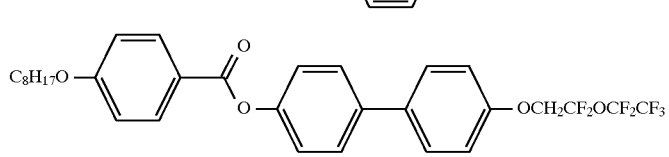
II-15

-continued
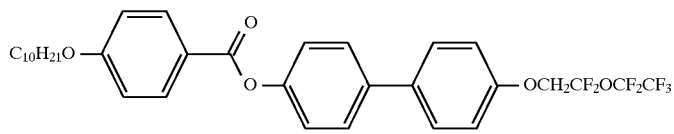
II-16
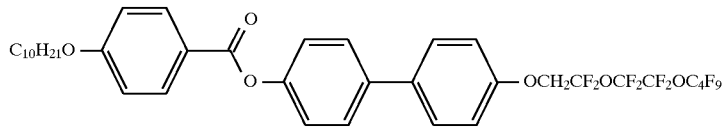
II-17
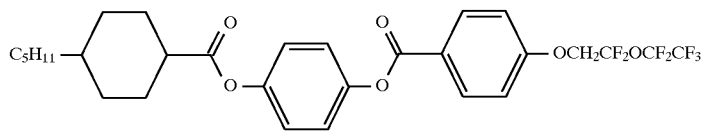
II-18
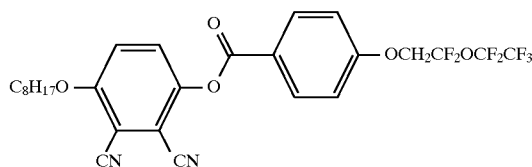
II-19
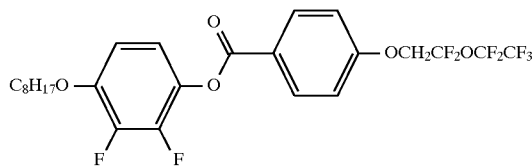
II-20
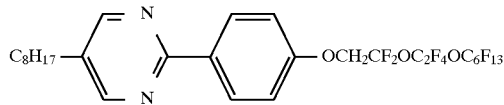
II-21
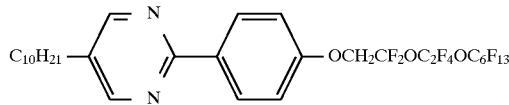
II-22
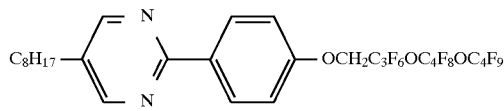
II-23
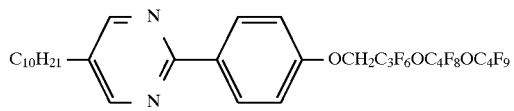
II-24
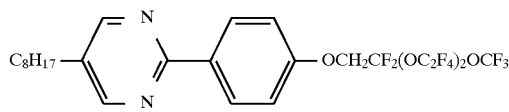
II-25
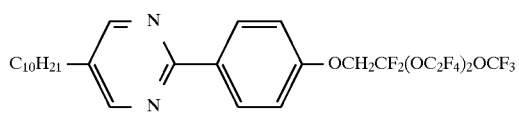
II-26
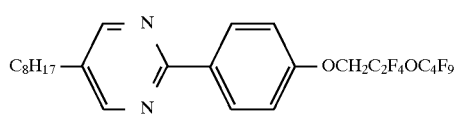
II-27

-continued
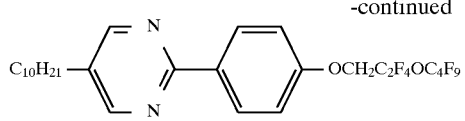 II-28
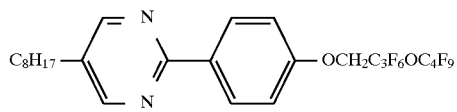 II-29
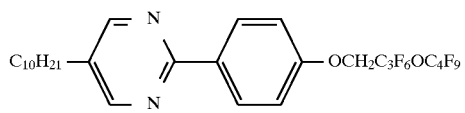 II-30
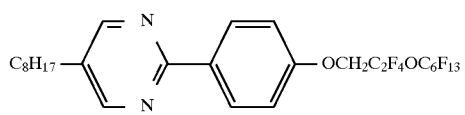 II-31
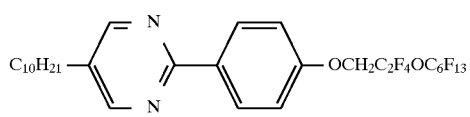 II-32
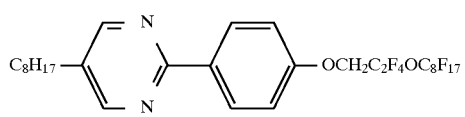 II-33
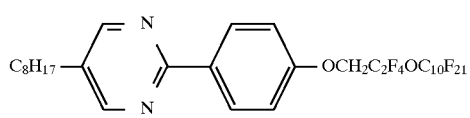 II-34
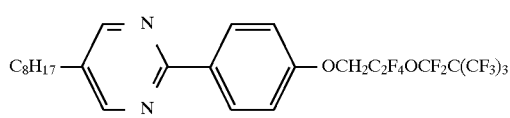 II-35
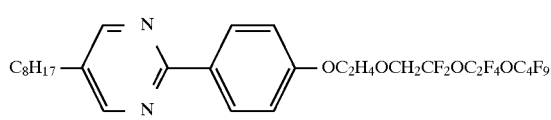 II-36
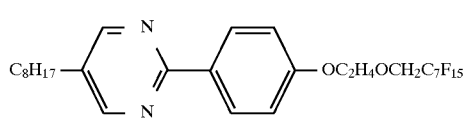 II-37
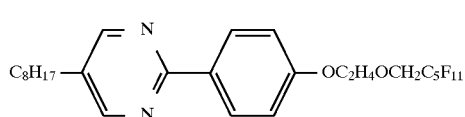 II-38
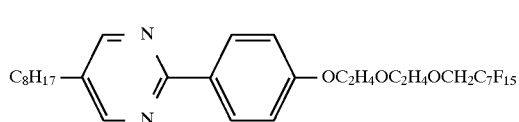 II-39
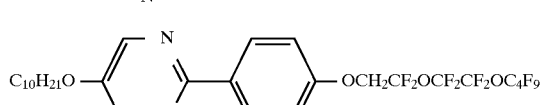 II-40
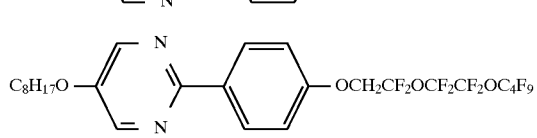 II-41

-continued

C₈H₁₇O—[pyrimidine]—[phenyl]—OCH₂CF₂OC₄F₉    II-42

C₈H₁₇O—[phenyl]—[pyrimidine]—OCH₂CF₂OC₄F₉    II-43

C₈H₁₇O—[phenyl]—[pyrimidine]—OCH₂CF₂OCF₂CF₂OC₄F₉    II-44

C₄H₉OCH₂CH₂OCH₂CH₂O—[pyrimidine]—[phenyl]—[phenyl]—OCH₂CF₂OCF₂CF₂OC₄F₉    II-45

The liquid crystal composition may further contain another mesomorphic compound having no fluorocarbon terminal portion ("hydrocarbon-type mesomorphic compound") in an appropriate amount.

The liquid crystal composition may preferably contain at least one species of an optically active (chiral) compound having a chained or cyclic optically active cite. The optically active compound may appropriately be selected in view of mutual solubility or compatibility with the fluorine-containing mesomorphic compound and other component compounds.

Specific examples of the hydrocarbon-type mesomorphic compound (free from a perfluorocarbon chain) as another mesomorphic compound may include those shown below.

C₈H₁₇—[pyrimidine]—[phenyl]—OC₆H₁₈

C₈H₁₇—[pyrimidine]—[phenyl]—OC₁₀H₂₁

C₉H₁₉—[pyrimidine]—[phenyl]—OC₆H₁₃

C₉H₁₉—[pyrimidine]—[phenyl]—OC₉H₁₉

C₇H₁₅—[pyrimidine]—[phenyl]—OC₆H₁₃

C₇H₁₅—[pyrimidine]—[phenyl]—OC₁₁H₂₃

-continued

C₆H₁₃—OC(=O)—[pyrimidine]—[phenyl]—OC₁₁H₂₃

C₉H₁₉—OC(=O)—[pyrimidine]—[phenyl]—OC₉H₁₉

C₁₁H₂₃—OC(=O)—[pyrimidine]—[phenyl]—C₆H₁₁

C₈H₁₇—OC(=O)—[pyrimidine]—[phenyl]—OC(=O)C₁₂H₂₅

C₁₀H₂₁O—[pyrimidine]—[phenyl]—OC₆H₁₃

C₁₂H₂₅O—[pyrimidine]—[phenyl]—OC₇H₁₅

C₇H₁₅O—[pyrimidine]—[phenyl]—OC₇H₁₅

C₆H₁₃O—[pyrimidine]—[phenyl]—OC₈H₁₇

C₉H₁₉O—[pyrimidine]—[phenyl]—OC₁₁H₂₃

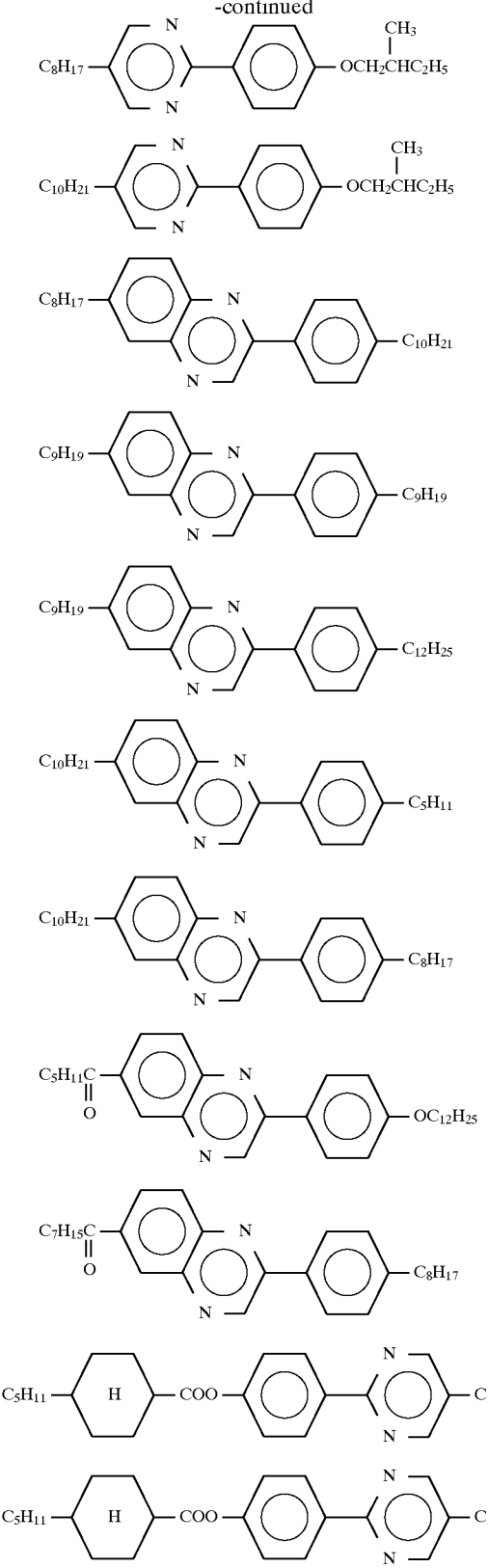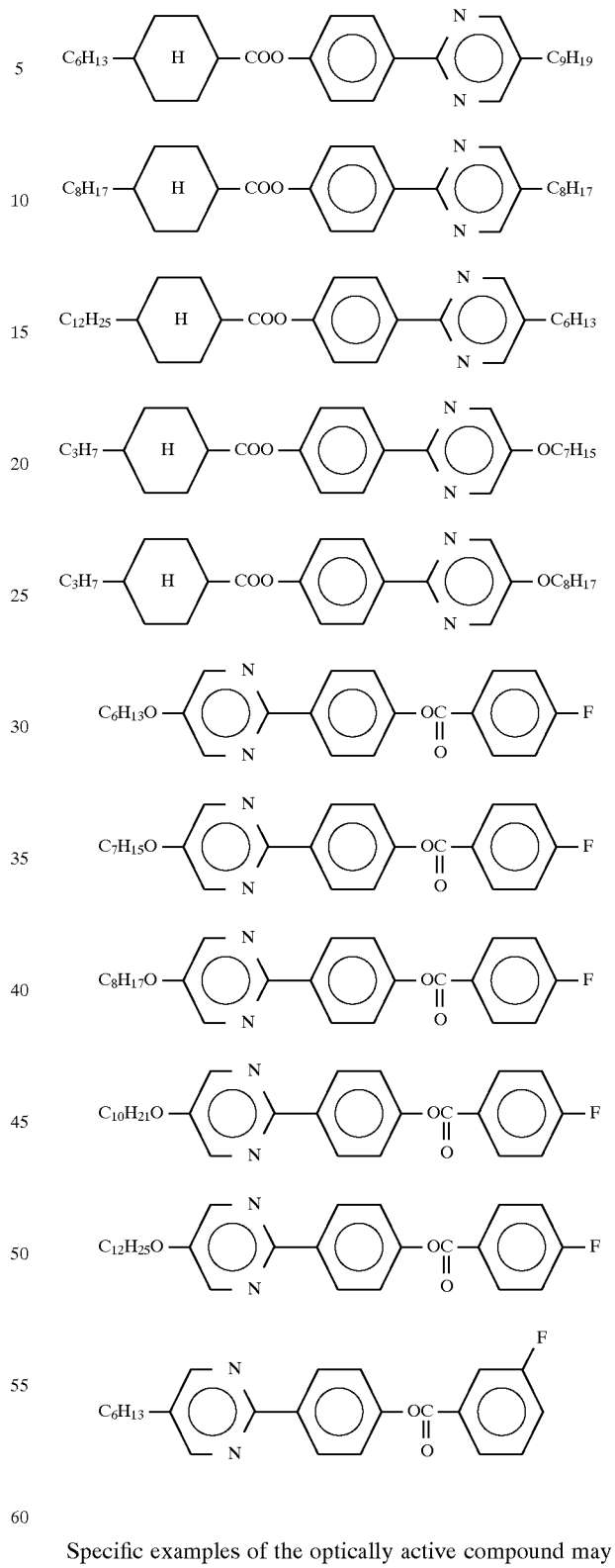
Specific examples of the optically active compound may preferably include those shown below.

TABLE A (for Compounds Nos. A-1 to A-105)
$R^{6''}-A^{6''}-X^{6''}-A^{7''}-A^{8''}-X^{7''}-R^{7''}-\Sigma^{**}-R^{9''}$

| No. | $R^{6''}$ | $A^{6''}$ | $X^{6''}$ | $A^{7''}$ | $A^{8''}$ | $X^{7''}$ | $R^{7''}$ | $\Sigma^{**}$ | $R^{9''}$ |
|---|---|---|---|---|---|---|---|---|---|
| 1 | $C_6H_{13}$ | — | — | Ph | Ph | — | M1 | Σ1 | $C_8H_{17}$ |
| 2 | $C_8H_{17}O$ | — | — | Ph | Ph | — | M1 | Σ1 | $C_{18}H_{37}$ |
| 3 | $C_5H_{11}O$ | — | — | Ph | Ph2F | — | M1 | Σ1 | $C_6H_{13}$ |
| 4 | $CH_3O$ | — | — | Ph | Ph | — | M1 | Σ1 | $C_6H_{13}$ |
| 5 | $C_6H_{13}CH(CH_3)(CH_2)_2O$ | — | — | Ph | Ph | — | M1 | Σ1 | $C_6H_{13}$ |
| 6 | $C_7H_{15}O$ | — | — | Ph | P23F | — | M1 | Σ1 | $C_6H_{13}$ |
| 7 | $C_6H_{13}$ | — | — | Ph | Ph | — | M1 | Σ1 | $C_9H_{19}$ |
| 8 | $C_7H_{15}O$ | — | — | Ph | Ph | — | M1 | Σ1 | $C_5H_{11}$ |
| 9 | $C_8H_{17}O$ | — | — | Ph | Ph | — | M1 | Σ1 | $C_6H_{13}$ |
| 10 | $C_8H_{17}$ | — | — | Pr1 | Ph | — | M1 | Σ1 | $C_8H_{17}$ |
| 11 | $C_{10}H_{21}$ | — | — | Pr2 | Ph | — | M1 | Σ1 | $C_4H_9$ |
| 12 | $C_{11}H_{23}$ | — | — | Pr2 | Ph | — | M1 | Σ1 | $C_6H_{13}$ |
| 13 | $C_{12}H_{25}$ | — | — | Pr2 | Ph | — | M1 | Σ1 | $C_8H_{17}$ |
| 14 | $C_4H_9O$ | — | — | Py1 | Ph | — | M1 | Σ1 | $C_{10}H_{21}$ |
| 15 | $C_{13}H_{27}$ | — | — | Py2 | Ph | — | M1 | Σ1 | $C_5H_{11}$ |
| 16 | $C_6H_{13}$ | — | — | Py2 | Ph | — | M1 | Σ1 | $C_8H_{17}$ |
| 17 | $C_6H_{13}CH(CH_3)CH_2O$ | — | — | Py2 | Ph | — | M1 | Σ1 | $C_9H_{19}$ |
| 18 | $C_5H_{11}O$ | — | — | Py2 | P23F | — | M1 | Σ1 | $C_4H_9$ |
| 19 | $C_{10}H_{21}$ | — | — | Py2 | Ph | — | M1 | Σ1 | $C_6H_{13}$ |
| 20 | $C_8H_{17}$ | — | — | Py2 | Ph3F | — | M1 | Σ1 | $C_8H_{17}$ |
| 21 | $C_8H_{13}$ | — | — | Cy | Ph | — | M1 | Σ1 | $C_4H_9$ |
| 22 | $C_3H_7$ | — | — | Cy | Ph | — | M1 | Σ1 | $C_5H_{11}$ |
| 23 | $C_5H_{11}$ | — | — | Cy | Ph | — | M1 | Σ1 | $C_{14}H_{29}$ |
| 24 | $C_{10}H_{21}$ | — | — | Cy | Ph | — | M1 | Σ1 | $C_{10}H_{21}$ |
| 25 | $C_6H_{13}$ | — | — | Pa | Ph | — | M1 | Σ1 | $C_{10}H_{21}$ |
| 26 | $C_7H_{15}OCO$ | — | — | Pd | Ph | — | M1 | Σ1 | $C_3H_7$ |
| 27 | $C_6H_{13}$ | — | — | Dt2 | Ph | — | M1 | Σ1 | $C_6H_{13}$ |
| 28 | $C_8H_{17}$ | — | — | Tn | Ph | — | M1 | Σ1 | $C_9H_{19}$ |
| 29 | $C_5H_{11}$ | — | — | Tz1 | Ph | — | M1 | Σ1 | $C_9H_{19}$ |
| 30 | $C_9H_{19}O$ | — | — | Tz2 | Ph | — | M1 | Σ1 | $C_6H_{13}$ |
| 31 | $C_2H_5$ | — | — | Td | Ph | — | M1 | Σ1 | $C_7H_{15}$ |
| 32 | $C_{10}H_{21}$ | — | — | Dx2 | Ph | — | M1 | Σ1 | $C_8H_{17}$ |
| 33 | $C_6H_{13}$ | — | — | Boa2 | Ph | — | M1 | Σ1 | $C_{10}H_{21}$ |
| 34 | $C_{15}H_{31}$ | — | — | Bob2 | Ph | — | M1 | Σ1 | $C_{10}H_{21}$ |
| 35 | $C_7H_{15}$ | — | — | Bta2 | Ph | — | M1 | Σ1 | $C_6H_{13}$ |
| 36 | $C_{16}H_{33}O$ | — | — | Btb2 | Ph | — | M1 | Σ1 | $C_9H_{19}$ |
| 37 | $C_6H_{13}$ | — | — | Np | Ph | — | M1 | Σ1 | $C_6H_{13}$ |
| 38 | $C_5H_{11}$ | — | — | Np | Ph | — | Cb | Σ1 | $C_4H_9$ |
| 39 | $C_8H_{17}CH(CH_3)CH_2O$ | — | — | Ep1 | Ph | — | Cb | Σ1 | $C_6H_{13}$ |
| 40 | $C_4H_9$ | — | — | Ep2 | Ph | — | M1 | Σ1 | $C_8H_{17}$ |
| 41 | $C_6H_{13}$ | — | — | Gp1 | Ph | — | M1 | Σ1 | $C_6H_{13}$ |
| 42 | $C_7H_{15}$ | — | — | Gp2 | Ph | — | M1 | Σ1 | $C_{12}H_{25}$ |
| 43 | $C_6H_{13}$ | — | — | Cm1 | Ph | — | M1 | Σ1 | $C_{10}H_{21}$ |
| 44 | $C_8H_{17}$ | — | — | Io1 | Ph | — | M1 | Σ1 | $C_{12}H_{25}$ |
| 45 | $C_{18}H_{37}$ | — | — | Id1 | Ph | M1 | M1 | Σ1 | $C_6H_{13}$ |
| 46 | $C_{11}H_{23}$ | — | — | Id1 | Ph | — | M1 | Σ1 | $C_5H_{11}$ |
| 47 | $C_8H_{17}$ | — | — | Id1 | Ph | — | M1 | Σ1 | $C_5H_{11}$ |
| 48 | $C_5H_{11}$ | — | — | Id1 | Ph2F | — | M1 | Σ1 | $C_6H_{13}$ |
| 49 | $C_6H_{13}$ | — | — | Tn | Ph | — | M1 | Σ1 | $C_6H_{13}$ |
| 50 | $C_4H_9O$ | — | — | Tz2 | Ph | — | M1 | Σ1 | $C_8H_{17}$ |
| 51 | $C_{12}H_{25}$ | — | — | Btb2 | Ph | — | M1 | Σ1 | $C_{10}H_{21}$ |
| 52 | $C_6H_{13}O$ | — | — | Btb2 | Ph | — | M1 | Σ1 | $C_6H_{13}$ |
| 53 | $CH_2=CH(CH_2)_3O$ | — | — | Ep2 | Ph | — | M1 | Σ1 | $C_5H_{11}$ |
| 54 | $C_9H_{19}$ | — | — | Gp2 | Ph | — | M1 | Σ1 | $C_6H_{13}$ |
| 55 | $C_5H_{11}$ | — | — | Np | Ph | — | M1 | Σ1 | $C_6H_{13}$ |
| 56 | $C_6H_{13}$ | Ph | — | Ph | Ph | Cb | M1 | Σ1 | $C_6H_{13}$ |
| 57 | $C_8H_{17}COO$ | Pr2 | — | Ph | Ph | — | M1 | Σ1 | $C_5H_{11}$ |
| 58 | $C_3H_7$ | Py2 | — | Ph | Ph | — | M1 | Σ1 | $C_4H_9$ |
| 59 | $C_5H_{11}$ | — | — | Ha2 | Ph | — | M1 | Σ1 | $C_4H_9$ |
| 60 | $C_6H_{13}$ | Ph | COO | Pr2 | Ph | — | M1 | Σ1 | $C_6H_{13}$ |
| 61 | $C_9H_{19}$ | Ph | — | Pr1 | Ph | — | Cb | Σ1 | $C_6H_{13}$ |
| 62 | $C_{13}H_{27}$ | Ph | — | Cy | P3Br | M1 | Cb | Σ1 | $C_5H_{11}$ |
| 63 | $C_{10}H_{21}O$ | Ph | OCO | Py1 | Ph | — | M1 | Σ2 | $C_6H_{13}$ |
| 64 | $C_7H_{15}$ | Ph | — | Py2 | Ph | — | M1 | Σ1 | $C_5H_{11}$ |
| 65 | $C_4H_9$ | Ph3TF | COO | Pa | Ph | — | M1 | Σ1 | $C_6H_{13}$ |
| 66 | $CH_3$ | — | — | Hb2 | Ph | — | M1 | Σ1 | $C_8H_{17}$ |
| 67 | $C_8H_{17}$ | Ph | — | Tn | Ph | — | M1 | Σ1 | $(CH_2)_3CH(CH_3)_2$ |
| 68 | $C_2H_5$ | Ph | — | Tz1 | Ph2M | — | M1 | Σ1 | $C_8H_{17}$ |
| 69 | $C_6H_{13}$ | Ph | — | Ph | Ph | — | M1 | Σ1 | $C_8H_{17}$ |
| 70 | $C_{10}H_{21}$ | Ph | — | Td | Ph | — | M1 | Σ1 | $(CH_2)_3CH(CH_3)_2$ |
| 71 | $C_{10}H_{21}$ | — | — | Ph | Py1 | — | M1 | Σ1 | $C_6H_{13}$ |
| 72 | $C_6H_{13}$ | — | — | Ph | Py1 | — | M1 | Σ1 | $C_4H_9$ |
| 73 | $C_6H_{13}OCO$ | — | — | Ph | Py1 | — | M1 | Σ1 | $C_6H_{13}$ |
| 74 | $C_7H_{15}$ | — | — | Ph | Pr2 | — | M1 | Σ1 | $C_5H_{11}$ |

TABLE A-continued (for Compounds Nos. A-1 to A-105)
$R^{6"}—A^{6"}—X^{6"}—A^{7"}—A^{8"}—X^{7"}—R^{7"}—\Sigma^{**}—R^{9"}$

| No. | $R^{6"}$ | $A^{6"}$ | $X^{6"}$ | $A^{7"}$ | $A^{8"}$ | $X^{7"}$ | $R^{7"}$ | $\Sigma^{**}$ | $R^{9"}$ |
|---|---|---|---|---|---|---|---|---|---|
| 75 | $C_9H_{19}$ | — | — | Ph | Pr2 | — | M1 | Σ1 | $(CH_2)_3CH(CH_3)_2$ |
| 76 | $C_7H_{15}$ | — | — | Ph | Pr2 | — | M1 | Σ1 | $C_6H_{13}$ |
| 77 | $C_5H_{11}O$ | — | — | Py2 | Cy | — | M1 | Σ1 | $C_{10}H_{21}$ |
| 78 | $C_4H_9$ | — | — | Ph | Cy | — | M1 | Σ1 | $C_{12}H_{25}$ |
| 79 | $C_{12}H_{25}$ | — | — | Ph | Cy | — | M1 | Σ1 | $C_5H_{11}$ |
| 80 | $C_6H_{13}C\equiv C$ | — | — | Ph | Pa | — | M1 | Σ1 | $C_{10}H_{21}$ |
| 81 | $C_8H_{17}O$ | — | — | Ph | Pd | — | M1 | Σ2 | $C_6H_{13}$ |
| 82 | $C_3H_7$ | — | — | P2Cl | Tn | — | M1 | Σ1 | $C_{10}H_{21}$ |
| 83 | $C_4H_9$ | — | — | Ph | Tn | — | M1 | Σ1 | $C_8H_{17}$ |
| 84 | $C_8H_{17}$ | — | — | Ph | Tz1 | — | M1 | Σ1 | $C_8H_{17}$ |
| 85 | $C_4H_9OCH(CH_3)COO$ | — | — | Ph | Tz1 | — | M1 | Σ1 | $C_7H_{15}$ |
| 86 | $C_6H_{13}$ | — | — | Ph2F | Td | — | M1 | Σ2 | $(CH_2)_3CH(CH_3)C_6H_{13}$ |
| 87 | $C_5H_{11}$ | — | — | Py2 | Np | — | M1 | Σ1 | $C_9H_{19}$ |
| 88 | $CH_3$ | — | — | Ph | Np | — | M1 | Σ1 | $C_{12}H_{25}$ |
| 89 | $C_{11}H_{23}$ | — | — | Ph | Np | — | M1 | Σ1 | $C_6H_{13}$ |
| 90 | $C_5H_{11}$ | — | — | Py1 | Ep1 | — | M1 | Σ1 | $C_5H_{11}$ |
| 91 | $C_8H_{17}OC_2H_4$ | — | — | Ph | Ep1 | — | M1 | Σ1 | $C_5H_{11}$ |
| 92 | $C_6H_{13}$ | — | — | Ph | Ep1 | — | M1 | Σ1 | $C_8H_{17}$ |
| 93 | $C_9H_{19}$ | — | — | Py1 | Gp1 | — | M1 | Σ1 | $C_5H_{11}$ |
| 94 | $C_8H_{17}$ | — | — | Ph | Gp1 | — | M1 | Σ1 | $C_6H_{13}$ |
| 95 | $C_3H_7COO$ | — | — | Ph | Gp1 | — | M1 | Σ1 | $C_8H_{17}$ |
| 96 | $C_4H_9$ | — | — | Ph | Id1 | — | M1 | Σ1 | $C_8H_{17}$ |
| 97 | $C_{12}H_{25}$ | — | — | Ph | Io1 | Cb | M1 | Σ1 | $C_6H_{13}$ |
| 98 | $C_{10}H_{21}$ | — | — | Ph | Cm1 | — | M1 | Σ1 | $C_8H_{17}$ |
| 99 | $C_6H_{13}$ | — | — | Ph | Ph | — | M1 | Σ1 | $C_8H_{17}$ |
| 100 | $C_3H_7$ | Ph | $OCH_2$ | Ph | Py1 | — | M1 | Σ1 | $C_{12}H_{25}$ |
| 101 | $C_4H_9$ | Ph2CN | — | Ph | Pr1 | — | M1 | Σ1 | $C_{10}H_{21}$ |
| 102 | $C_5H_{11}$ | Ph | $CH_2O$ | Ph3F | Tz1 | Cb | M1 | Σ1 | $C_6H_{13}$ |
| 103 | $C_6H_{13}$ | Ph | — | Ph | Tn | — | M1 | Σ1 | $C_8H_{17}$ |
| 104 | $C_7H_{15}$ | Tn | — | Ph | Py1 | — | M1 | Σ1 | $C_8H_{17}$ |
| 105 | $C_{10}H_{21}$ | Ph | — | Ph | Cy1 | — | M1 | Σ1 | $C_5H_{11}$ |

In Table A, the respective abbreviations (symbols) mean the following groups, respectively.

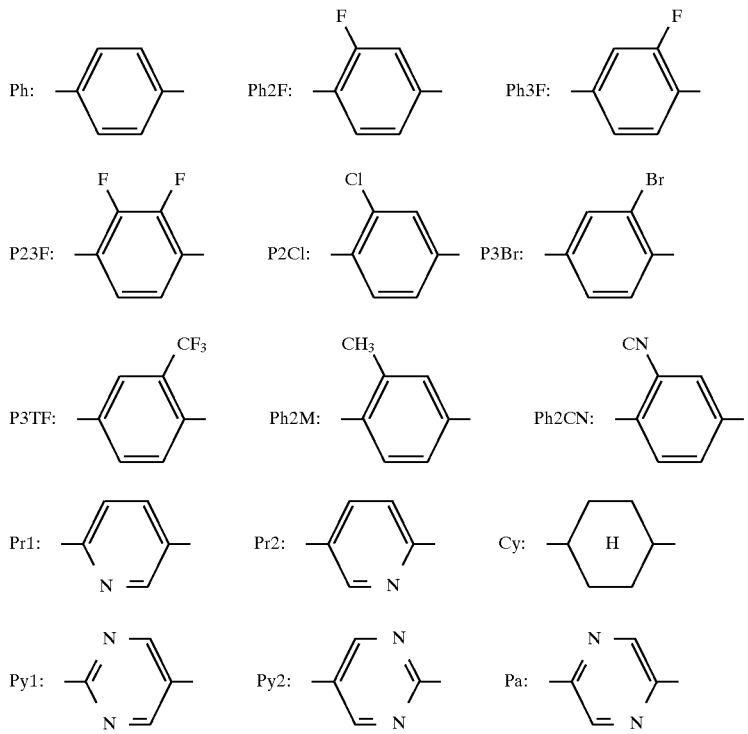

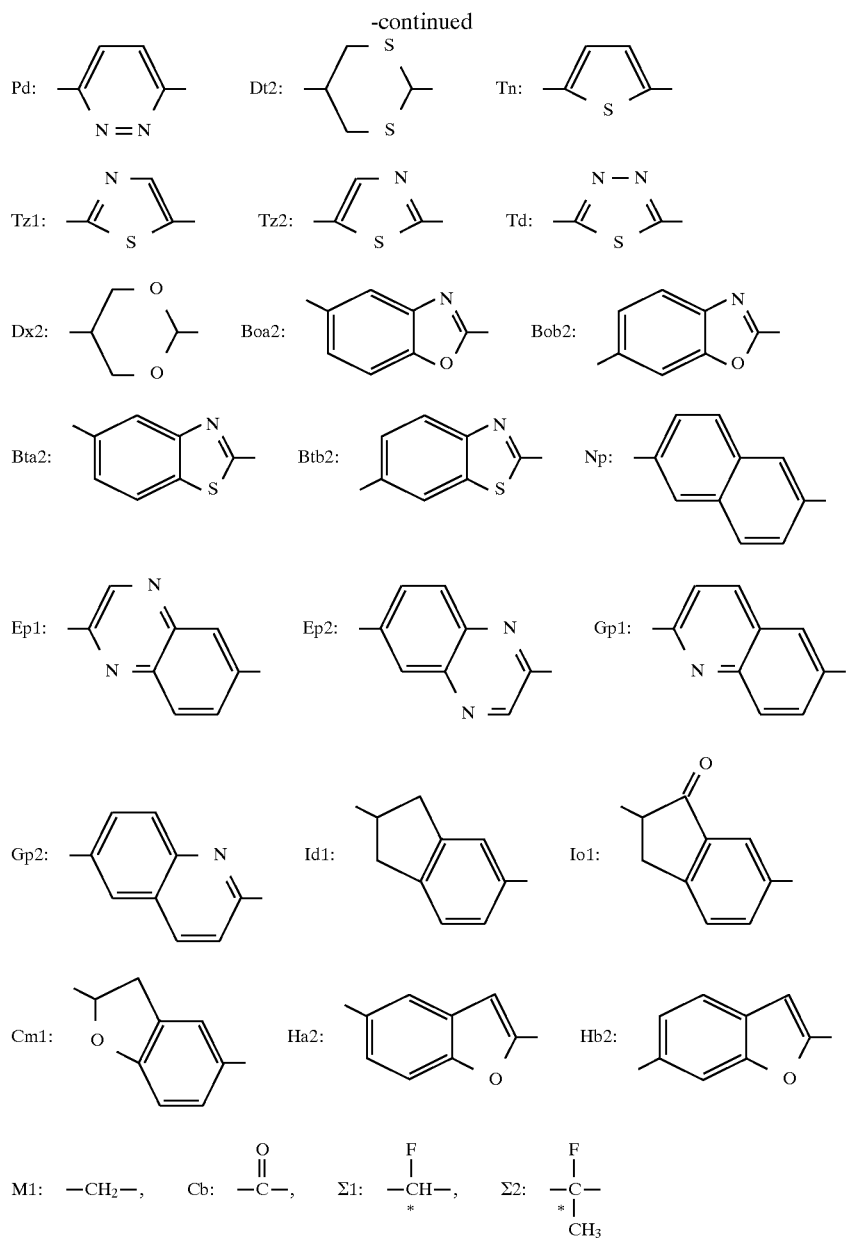

-continued
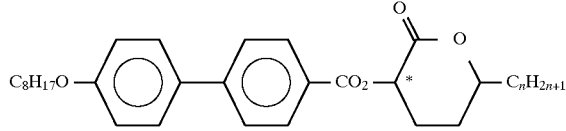
D-1: n = 6, 2R, 5R  D-2: n = 6, 2S, 5R  D-3: n = 4, 2R, 5R  D-4: n = 4, 2S, 5R  D-5: n = 3, 2R, 5R
D-6: n = 2, 2S, 5R  D-7: n = 2, 2R, 5R  D-8: n = 1, 2S, 5R  D-9: n = 1, 2R, 5R
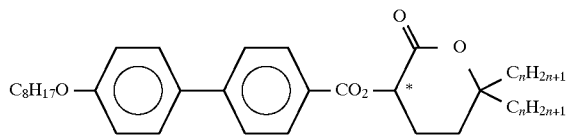
D-10: n = 1  D-11: n = 2  D-12: n = 3  D-13: n = 4  D-14: n = 6  D-15: n = 10
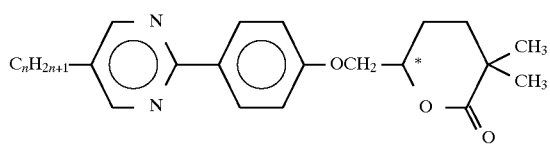
D-16: n = 8  D-17: n = 10
E-1: (2,5-cis) 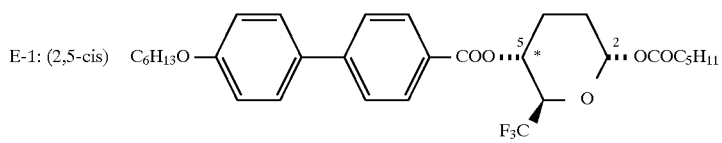
E-2: (2,5-cis)
E-3: (2,5-trans) 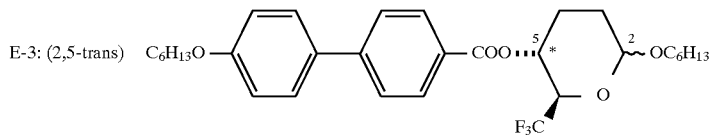
E-4: (2,5-cis)
E-5: (2,5-trans) 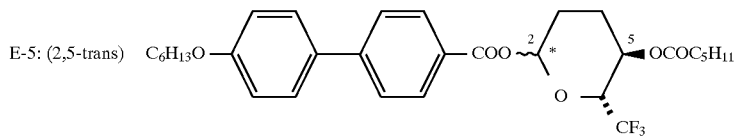
E-6: (2,5-cis)
E-7: (2,5-trans) 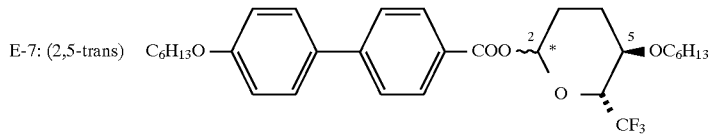
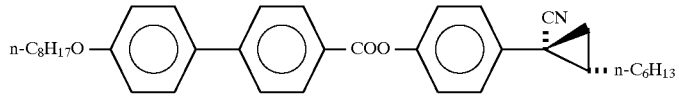
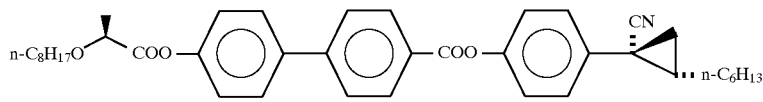
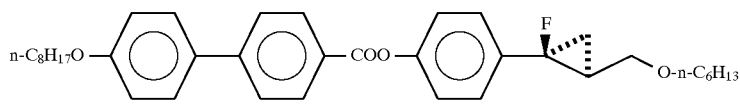

-continued

| $R_{11}$ | $R_{12}$ | $R_{13}$ | Configuration |
|---|---|---|---|
|  | $C_5H_{11}$ | $C_4H_9$ | 2S, 4S (cis) |
|  | $C_5H_{11}$ | $C_4H_9$ | 2R, 4S (trans) |
| 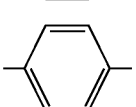 | $C_8H_{17}$ | $C_3H_7$ | 2S, 4S (cis) |
| 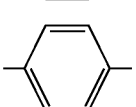 | $C_8H_{17}$ | $C_3H_7$ | 2R, 4S (trans) |
| 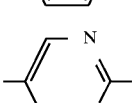 | $C_8H_{17}O$ | $C_4H_9$ | 2S, 4S (cis) |
| 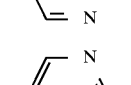 | $C_8H_{17}O$ | $C_4H_9$ | 2R, 4S (trans) |

The smectic liquid crystal used in the invention may further contain additives such as an antioxidant, an ultraviolet ray-absorbing agent, dyes and pigments.

The liquid crystal device according to the present invention is used as a display element (medium), for various liquid crystal apparatus, one embodiment of which is described below.

Figure 6:
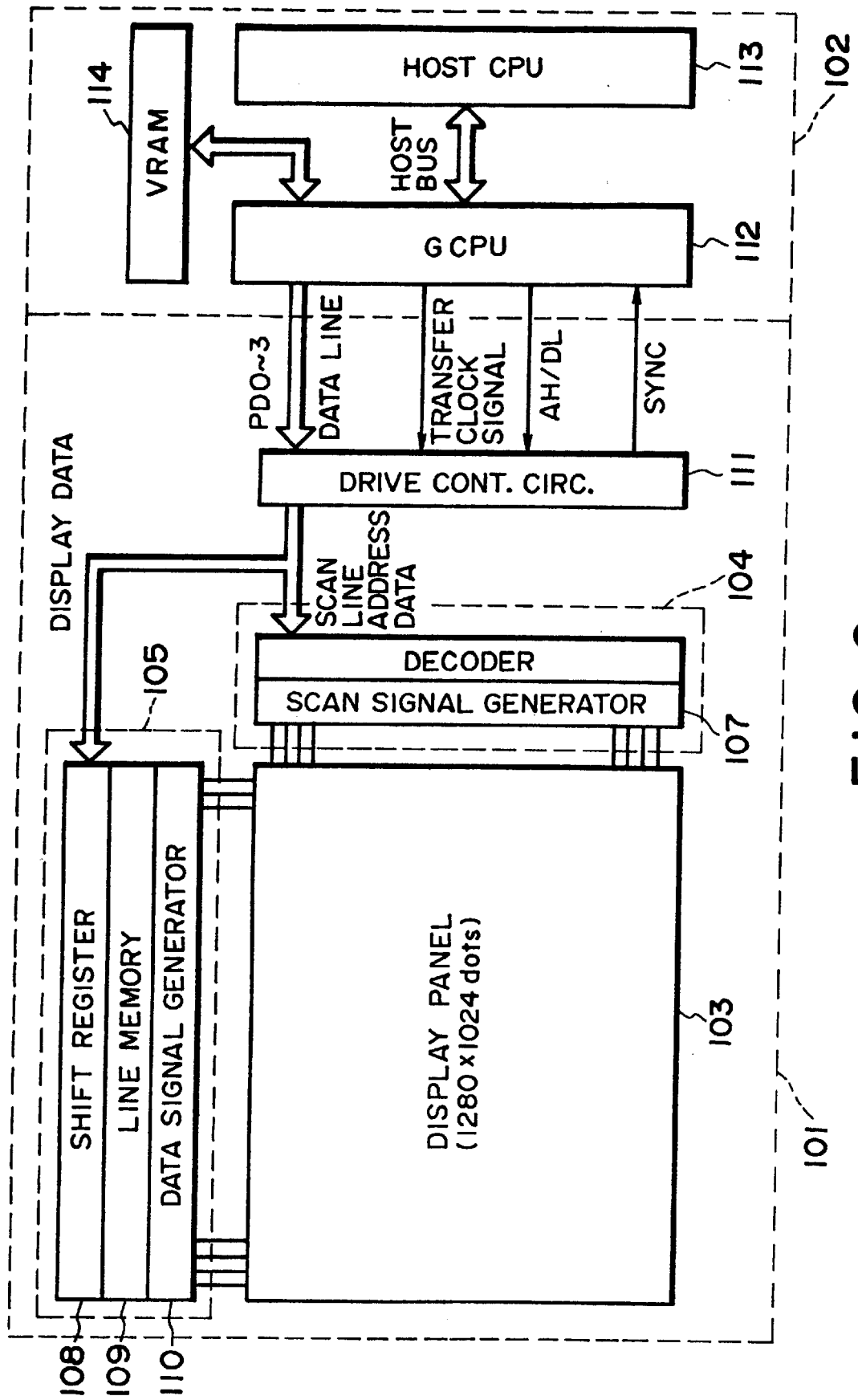
FIG. 6 is a block diagram showing an embodiment of a liquid crystal (display) apparatus comprising a liquid crystal device of the present invention and a graphic controller.
Figure 7:
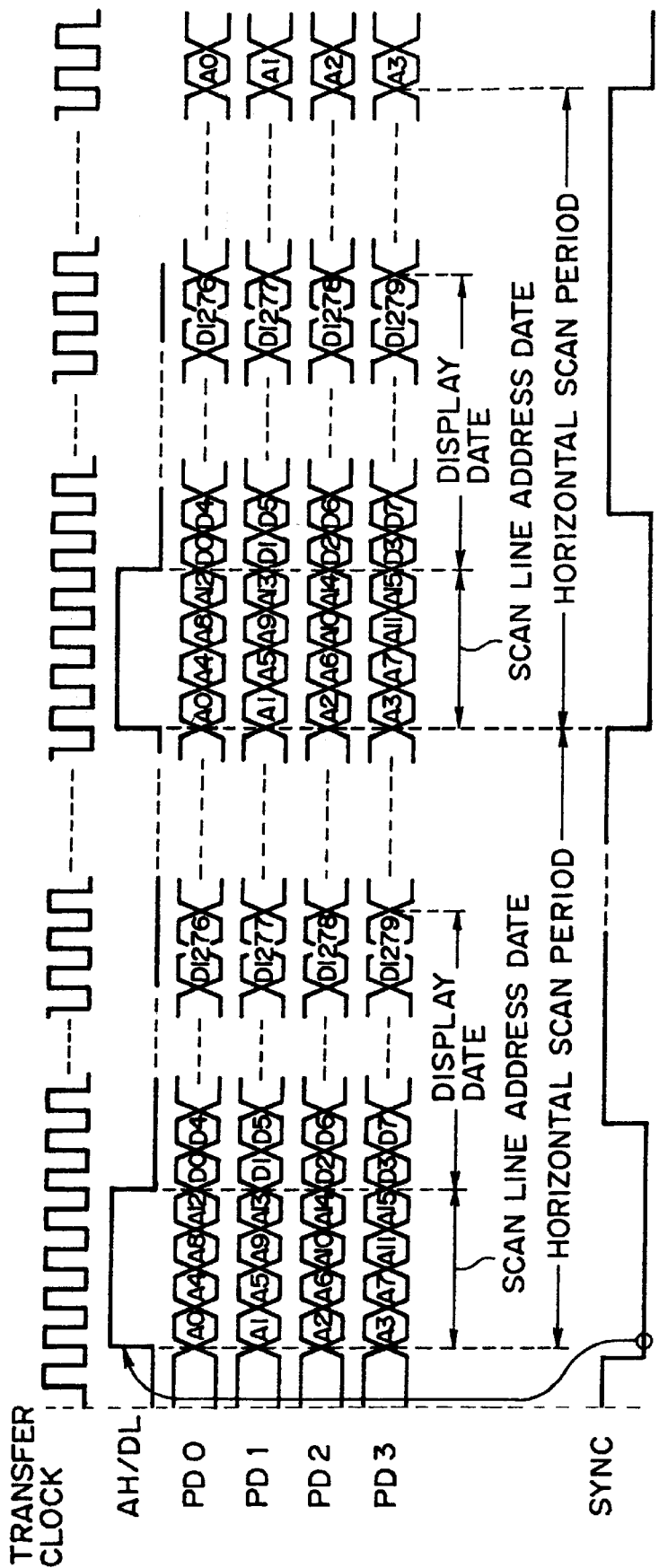
FIG. 7 is a time chart of image data communication showing time correlation between signal transfer and driving with respect to a liquid crystal display apparatus and a graphic controller.

Based on an arrangement appearing hereinbelow and data format comprising image data accompanied with scanning line address data and by adopting communication synchronization using a SYNC signal as shown in FIGS. 6 and 7, there is provided a liquid crystal display apparatus of the present invention which uses the liquid crystal device as a display panel portion.

Referring to FIG. 6, a chiral smectic liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to a display panel 103 by signal transfer means. The graphic controller 102 principally comprises a CPU (central processing unit, hereinafter referred to as "GCPU") 112 and a VRAM (video-RAM, image data storage memory) 114 and is in charge of management and communication of image data between a host CPU 113 and the liquid crystal display apparatus (FLCD) 101. The control of the display apparatus is principally performed by the graphic controller 102. A light source (not shown) is disposed behind the display panel 103.

The liquid crystal apparatus of the present invention employs the above-described liquid crystal device showing a good switching characteristic as a display panel (medium), so that the liquid crystal apparatus exhibits excellent drive characteristics and reliability and provides high-definition and large-area display images at high speed.

The liquid crystal device according to the present invention may be driven by driving methods as disclosed in, e.g., JP-A 59-193426, JP-A 59-193427, JP-A 60-156046 and JP-A 60-156047.

Figure 8A:
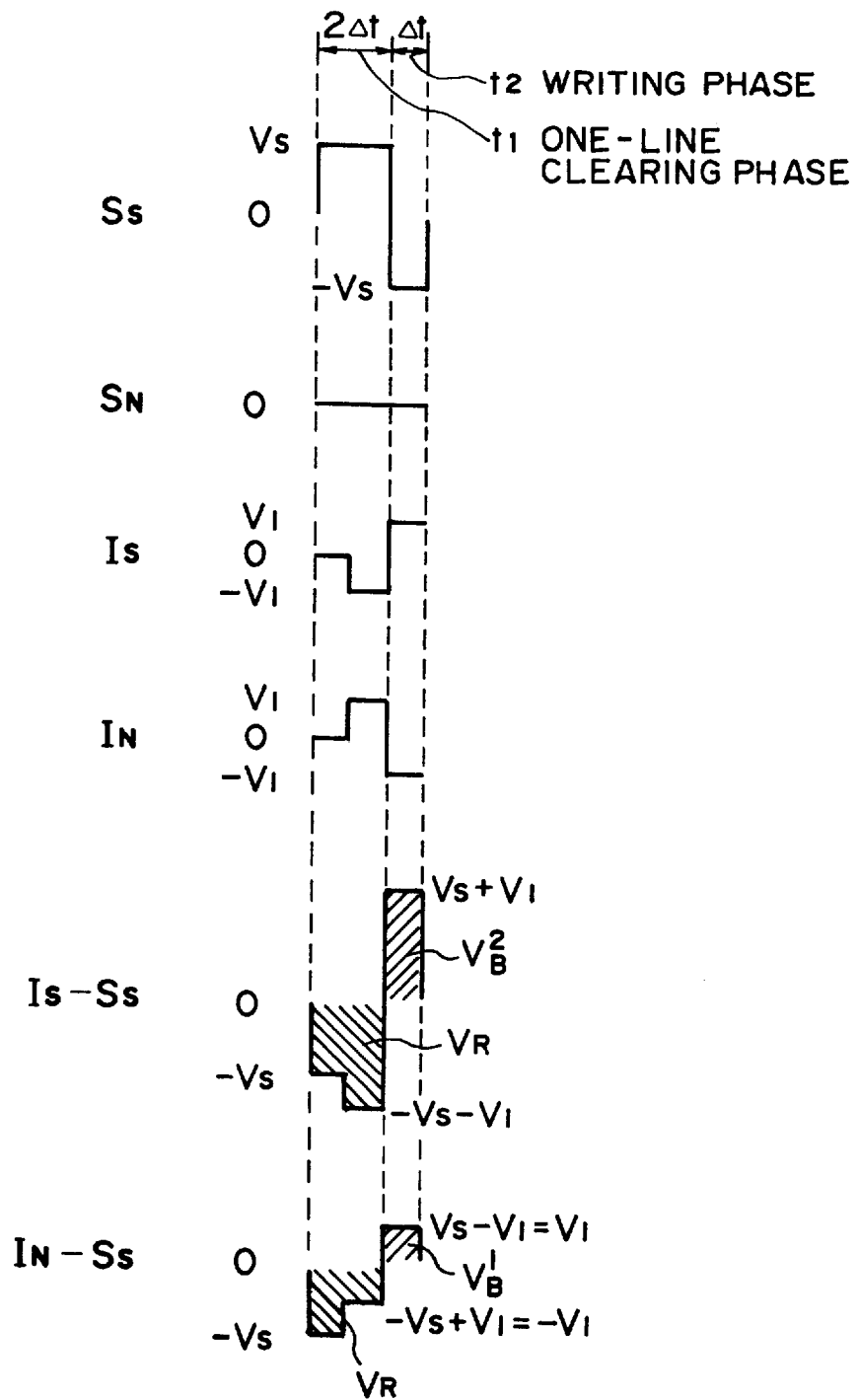
FIG. 8A shows an embodiment of unit driving waveforms and FIG. 8B is time-serial waveforms comprising a succession of such unit waveforms.
Figure 8B:
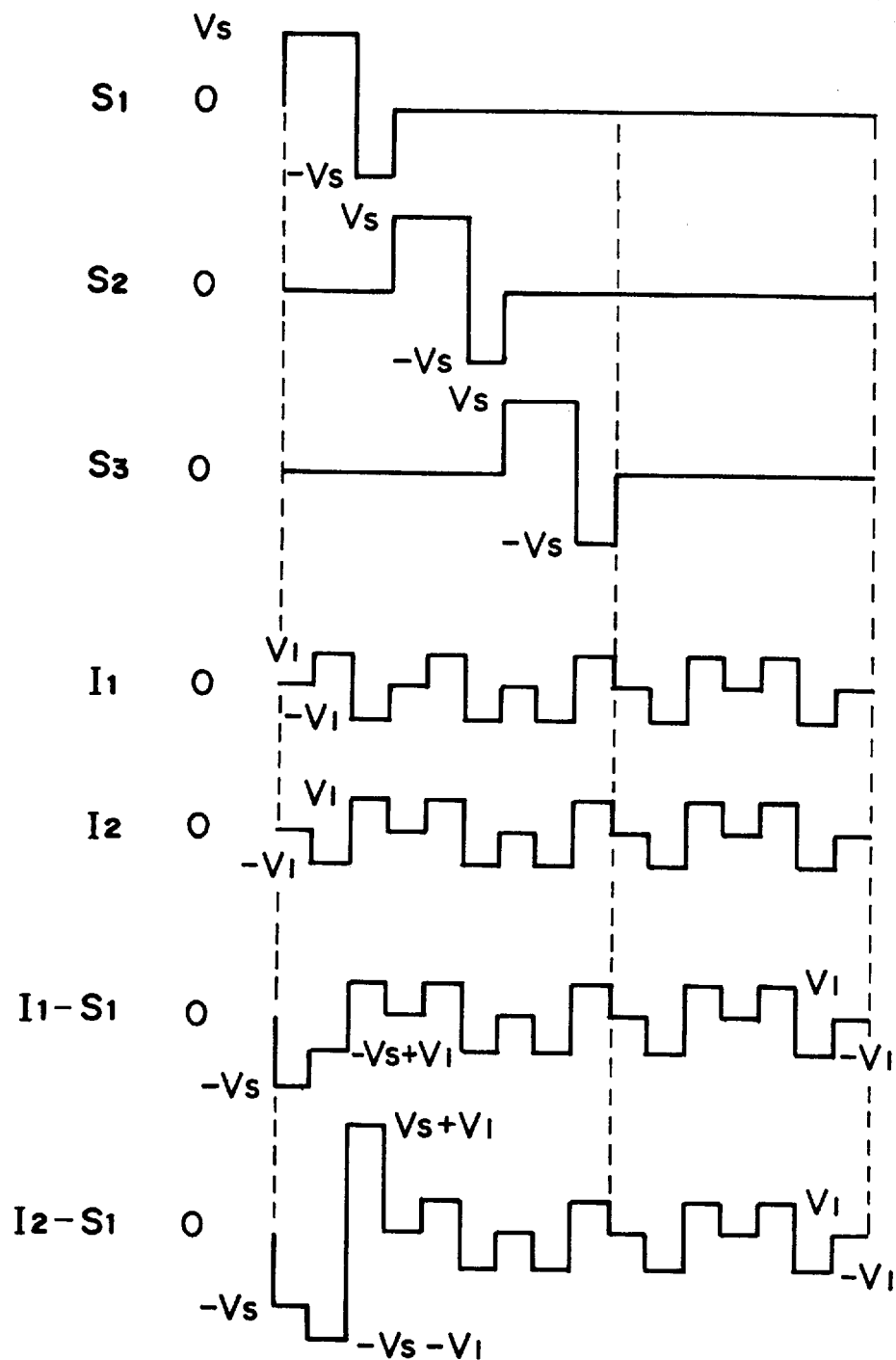
Figure 9:
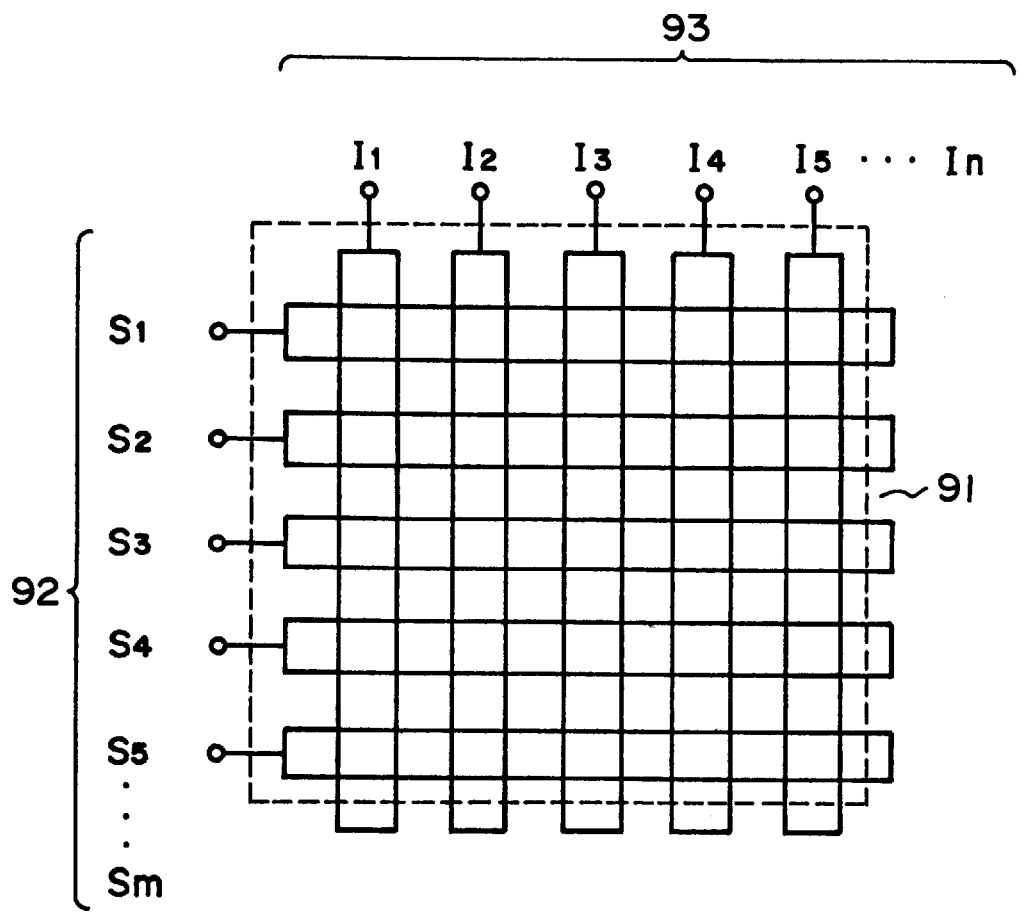
FIG. 9 is a plan view of an electrode matrix.

FIGS. 8A and 8B are waveform diagrams showing an example set of driving waveforms used in such a driving method. FIG. 9 is a plan view showing an electrode matrix used in a chiral smectic liquid crystal panel 91 of a simple matrix-type. The liquid crystal panel 91 shown in FIG. 9 includes scanning electrodes 92 ($S_1$, $S_2$, $S_3$, ... $S_m$) and data electrodes 93 ($I_1$, $I_2$, $I_3$, ... $I_n$) intersecting each other so as to constitute a pixel at each intersection together with a chiral smectic liquid crystal disposed between the scanning electrodes 92 and data electrodes 93.

Figure 10:
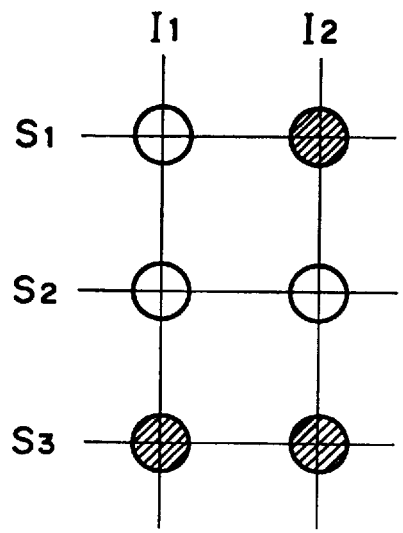
FIG. 10 is an illustration of a display pattern obtained by an actual drive using the time-serial waveforms shown in FIG. 8B.

Referring to FIG. 8A, at $S_S$ is shown a selection scanning signal waveform applied to a selected scanning line, at $S_N$ is shown a non-selection scanning signal waveform applied to a non-selected scanning line, at $I_S$ is shown a selection data signal waveform (providing a black display state) applied to a selected data line, and at $I_N$ is shown a non-selection data signal waveform applied to a non-selected data line. Further, at $I_S$–$S_S$ and $I_N$–$S_S$ in the figure are shown voltage waveforms applied to pixels on a selected scanning line, whereby a pixel supplied with the voltage $I_S$–$S_S$ assumes a black display state and a pixel supplied with the voltage $I_N$–$S_S$ assumes a white display state. FIG. 8B shows a time-serial waveform used for providing a display state as shown in FIG. 10.

In the driving embodiment shown in FIGS. 8A and 8B, a minimum duration (application time) $\Delta t$ of a single polarity voltage applied to a pixel on a selected scanning line corresponds to the period of a writing phase $t_2$, and the period of a one-line clearing phase $t_1$ is set to $2\Delta t$.

The parameters $V_S$, $V_I$ and $\Delta t$ in the driving waveforms shown in FIGS. 8A and 8B are determined depending on switching characteristics of a liquid crystal material used.

Figure 11:
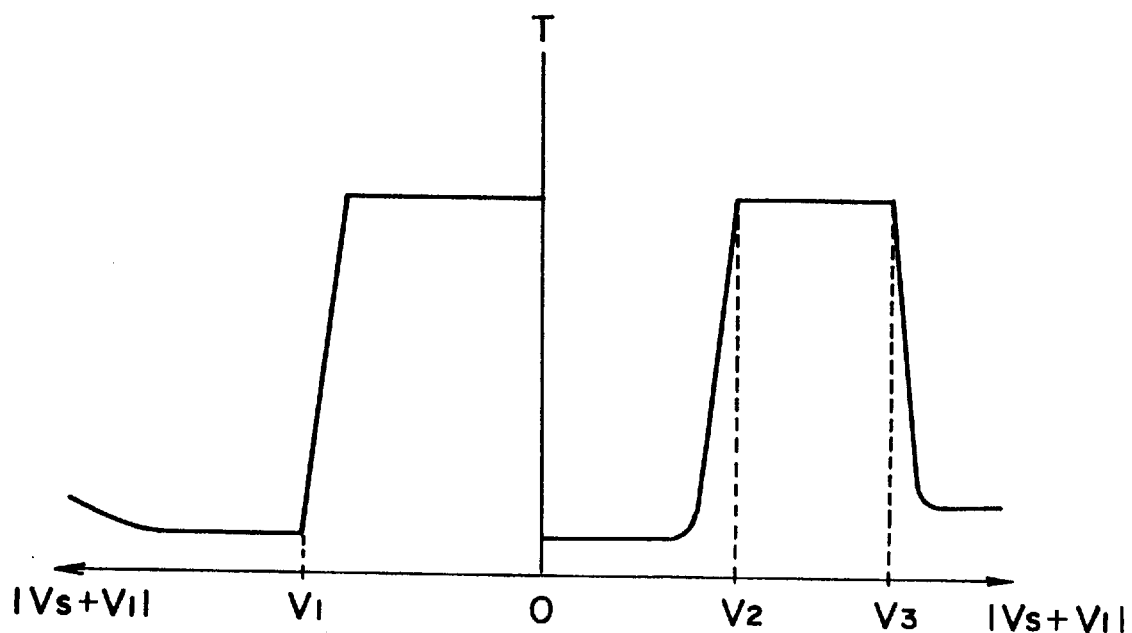
FIG. 11 is a V-T characteristic chart showing a change in transmittance under application of different drive voltages at the time of diving the liquid crystal device of the present invention in a matrix-addressed driving scheme.

FIG. 11 shows a V–T characteristic, i.e., a change in transmittance T when a driving voltage denoted by ($V_S+V_I$) is changed while a bias ratio as mentioned hereinbelow is kept constant. In this embodiment, the parameters are fixed at constant values of $\Delta t$=50 $\mu$s and a bias ratio $V_I/(V_I+V_S)$ =1/3. On the right side of FIG. 11 is shown a result when the voltage ($I_{N-SS}$) shown in FIG. 8A is applied to a pixel concerned, and on the left side of FIG. 11 is shown a result when the voltage ($I_{S}$–$S_S$) is applied to a pixel concerned, respectively while increasing the voltage ($V_S+V_I$). On both sides of the ordinate, the absolute value of the voltage ($V_S+V_I$) is separately indicated, At ($I_N$–$S_S$) and ($I_S$–$S_S$), a previous (display) state is cleared by applying a voltage $V_R$ and a subsequent (display) state is determined by voltages $V_B^1$ and $V_B^2$, respectively. Referring to FIG. 11, a relationship of $V_2<V_1<V_3$ holds. The voltage $V_1$ may be referred to as a threshold voltage in actual drive and the voltage $V_3$ may be referred to as a crosstalk voltage. More specifically, as shown in FIG. 8A, a voltage $V_1$ denotes a voltage value causing switching by applying a voltage signal $V_B^2$ and a voltage $V_3$ denotes a voltage value causing switching by applying a voltage signal $V_B^1$. Further, a voltage $V_2$ denotes a voltage value required for clearing the previous state by applying a voltage signal $V_R$. The crosstalk voltage $V_3$ is generally present in actual matrix drive of a ferroelectric liquid crystal device. In an actual drive, $\Delta V=(V_3-V_1)$ provides a range of $|V_S+V_I|$ allowing a matrix drive and may be referred to as a (drive) voltage margin, which is preferably large enough. It is of course possible to increase the value of $V_3$ and thus $\Delta V(=V_3-V_1)$ by increasing the bias ratio (i.e., by causing the bias ratio to approach a unity). However, a large bias ratio corresponds to a large amplitude of a data signal and leads to an increase in flickering and a lower contrast, thus being undesirable in respect of image quality. According to our study, a bias ratio of about 1/3–1/4 was practical. On the other hand, when the bias ratio is fixed, the voltage margin $\Delta V$ strongly depends on the switching characteristics of a liquid crystal material used, and it is needless to say that a liquid crystal material providing a large $\Delta V$ is very advantageous for matrix drive.

Further, it is possible to drive the liquid crystal device by changing a voltage application time (duration) $\Delta t$ while keeping the driving voltage ($V_I+V_S$) so as to provide a certain (constant) value. In this case, the drive characteristic of the liquid crystal device can be evaluated in terms of a duration margin (voltage application time margin) $\Delta T=\Delta t_2-\Delta t_1$ wherein $\Delta t_1$ denotes a threshold duration and $\Delta t_2$ denotes a crosstalk duration. The duration margin $\Delta T$ means a duration allowing a matrix drive under application of a certain driving voltage ($V_I+V_S$).

The upper and lower limits of application voltages or durations and a difference therebetween (driving voltage margin $\Delta V$ or duration margin $\Delta T$) by which selected pixels are written in two states of "black" and "white" and non-selected pixels can retain the written "black" and "white" states at a constant temperature as described above, vary depending on and are intrinsic to a liquid crystal material used and a cell structure employed. Further, the driving margin (voltage or duration margin) is deviated according to a change in environmental temperature, so that optimum driving conditions should be required of an actual display apparatus in view of a liquid crystal material used, a cell (device) structure and an environmental temperature.

Hereinbelow, the present invention will be described more specifically based on Examples. It is however to be understood that the present invention is not restricted to these Examples.

In the following examples, measurement of respective physical properties and evaluation of respective items were performed in the following manner.

<Measurement of surface energy>

A contact angle measuring apparatus ("Model CA-DT", available from Kyowa Kaimen Kagaku K.K.) is used.

A glass substrate coated with a sample alignment film is provided, and α-bromonaphthalene, methylene iodide and pure water are separately dripped to measure contact angles $\theta_1$, $\theta_2$ and $\theta_3$, respectively, with the alignment film. By substituting the measured values $\theta_1$, $\theta_2$ and $\theta_3$ into formulae shown below to calculate a dispersion term $\gamma_s^d$, a polarization term $\gamma_s^p$, and a hydrogen bond term $\gamma_s^h$ from which the surface energy $\gamma_1$ and $\gamma_2$ is calculated as $\gamma_s^d+\gamma_s^p+\gamma_s^h$:

$$\sqrt{\gamma_s d} = \frac{1}{2}\sqrt{44.6}\,(1+\cos\theta_1),$$

$$\sqrt{\gamma_s p} = \frac{(46.8+4.0)(1+\cos\theta_2)-2\sqrt{46.8}\sqrt{\gamma_s d}}{2\sqrt{4.0}}$$

$$\sqrt{\gamma_s h} = \frac{(29.1+1.3+42.4)(1+\cos\theta_3)-2\sqrt{29.1}\sqrt{\gamma_s d}-2\sqrt{1.3}\sqrt{\gamma_s p}}{2\sqrt{42.4}}$$

wherein the respective factors represent the following terms:

44.6: surface energy of α-bromonaphthalene, 46.8 and 4.0: dispersion term, and polarization term, respectively of methylene iodide, 29.1, 1.3 and 42.4: dispersion term, polarization term and hydrogen bond term, respectively, of pure water.

<Measurement of volume resistivity>

The manner of measuring a film volume resistivity referred to herein will be described with reference to FIGS. 12 and 13.

FIG. 12 is a schematic thicknesswise sectional view of a system for measuring a resistance of an objective film in its thickness direction. The system includes an objective film 101, through which a current is flowed between an e.g., 1 mm-dia. Al electrode 102 and an ITO electrode 103 formed on a glass substrate 100. FIG. 13B is a schematic sectional view of a system for measuring a resistance of an objective film 104 in a sheet extension direction thereof, in which a current is flowed between electrodes 105 and 106 both formed on the objective film 104 and having an electrode pattern as shown in FIG. 13A. As shown in FIG. 13A, the electrode 105 has an annular shape having an outer diameter of 18 mm and an inner diameter of 11 mm. The electrode 106 has a circular shape of 6 mm in diameter.

<Evaluation of alignment defect>

A liquid crystal device is disposed between a pair of polarizers and is supplied with a drive waveform so as to cause a switching into an entire dark (black: BL) state and an entire bright (white: W) state, followed by an observation of an alignment state of liquid crystal molecules in a region (500×500 μm) through a microscope.

<Evaluation of threshold pulse width (and reverse domain)>

A liquid crystal device is driven by using a drive voltage waveform $I_S$–$S_S$ shown in FIG. 8A and $V_S$+$V_I$ of 20 V while successively increasing a pulse width, whereby a threshold pulse width (a minimum pulse width allowing a complete switching between two stable states).

Further, the liquid crystal device is subjected to observation of a state of an occurrence of a reverse domain due to an alignment defect while further increasing the threshold pulse width.

<Evaluation of contrast>

A liquid crystal device is disposed between a pair of polarizers in cross nicols and driven at 25° C. by using a driving waveform shown in FIGS. 8A and 8B (1/3 bias, $V_S$+$V_I$=10 V, ΔT being 1.3 times a threshold pulse width) to measure transmittances at the time of displaying a white (W) state and a black (BL) state, respectively. The contrast is evaluated as a ratio therebetween. The driving of the liquid crystal device is performed under a cross nicol condition providing one light extinction position (at which the lowest transmittance is obtained) when an electric field is not applied to the liquid crystal device. At this time, outside one of the polarizers, a light source providing a constant light quantity is disposed.

<Evaluation of flickering>

Under cross nicol condition at 25° C., a liquid crystal device is driven by using a driving waveform shown in FIGS. 8A and 8B (1/3 bias, $V_S$+$V_I$=10 V, frequency=20 Hz) to effect display of W and BL states. At this time, a degree of flickering is observed by eyes from a position 50 cm distant from the liquid crystal device.

<Evaluation of shock resistance>

By using a machine ("MDST 900", mfd. Yoshida Seiki K.K.) and a liquid crystal device fixed in a metal frame, a drop test is performed while changing a degree of shock (e.g., 20 G and 40 G) to observe an occurrence of an alignment defect in sanded texture.

EXAMPLE 1

A liquid crystal composition was prepared by mixing the following compounds in the indicating proportions.

| Compound No. | Structural formula |
|---|---|
| (a) | $C_8H_{17}$–[pyrimidine]–[phenyl]–$OCH_2CF_2OCF_2CF_2OC_4F_9$ |
| (b) | $C_8H_{17}$–[pyrimidine]–[phenyl]–$OCH_2C_3F_6OC_4F_9$ |
| (c) | $C_8H_{17}$–[pyrimidine]–[phenyl]–$OCH_2CF_2OC_2F_4OC_2F_4OCF_3$ |
| (d) | $C_6H_{13}O$–[cyclohexyl with $F_3C$]–$OC(=O)$–[biphenyl]–$OC_6H_{13}$ |
| (e) | $H_3C$, $H_3C$–[lactone]–$CH_2O$–[phenyl]–[pyrimidine]–$OC_8H_{17}$ |

(Components) (wt. parts)
(a):(b):(c):(d):(e) = 45:15:30:5:2

The liquid crystal composition showed the following phase transition series, a tilt angle H, and a spontaneous polarization Ps, respectively.

Phase transition temperature (°C.)

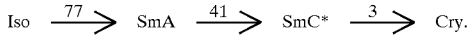

Iso.: isotropic phase,
SmA: smectic A phase,
SmC*: chiral smectic C phase,
Cry.: crystal phase.
(H)(at 30° C.)=24.4 degrees
Ps (at 30° C.)=−31.1 nC/cm².

Then, a liquid crystal device was prepared in the following manner.

<Cell B-1>

One 1.1 mm-thick glass substrate provided with a 20 nm-thick ITO film (transparent electrode) was coated with a solution in a mixture solvent of N-methylpyrrolidone/n-butyl cellosolve (=2/1) of a precursor to a polyimide represented by a recurring unit of the formula shown below by spin coating, followed by pre-drying at 80° C. for 5 min. and hot baking at 250° C. for 1 hour, to form a 6 nm-thick alignment control film, which was then rubbed with a nylon cloth as a uniaxial aligning treatment.

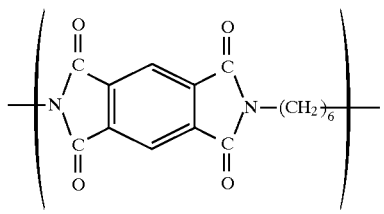

The substrate provided a surface energy of 45 dyne/cm at the surface of the uniaxial aligning-treatment alignment control film.

On the above substrate, a sealing agent ("Struct Bond", mfd. by Mitsui Toatsu Kagaku K.K.) was applied at a peripheral portion thereof by printing.

The other 1.1 mm-thick glass substrate provided with a 20 nm-thick ITO film was coated with a mixture solution in ethanol of 0.01 wt. % (based on ethanol) of silica beads (average particle size=2 $\mu$m) and 1.0 wt. % (based on ethanol and silica beads) of silane coupling agent (octadecyltriethoxysilane="ODS-E", mfd. by Chisso K.K.) by spin coating at 2000 rpm for 20 sec., followed by drying at 120° C. for 15 min., thus effecting a surface treatment of the silica beads with the silane coupling agent and formation of an alignment control film (not subjected to a uniaxial aligning treatment) at the same time. At this time, the silica beads were dispersed at a (dispersion) density of about 300 particles/mm².

The thus-prepared substrate provided a surface energy of 26 dyne/cm at the surface of the non-uniaxial aligning-treated alignment control film.

The two substrates prepared above were applied to each other to form a blank cell with a cell gap of ca. 1.8 $\mu$m, which was then filled with the above-prepared liquid crystal composition in an isotropic liquid state under vacuum (reduced pressure), followed by a gradual cooling to room temperature at a rate of 0.1° C./min. to form a liquid crystal device.

When the liquid crystal device was subjected to observation of an alignment state of liquid crystal molecules, alignment defects in a shape as shown in FIGS. 3 and 4 and having a size of ca. 50 $\mu$m (length) and ca. 7 $\mu$m (width) were confirmed in the vicinity of the silica beads but an occurrence of a reverse domain from the alignment defects was not observed until a pulse width being 2.2 times as large as a threshold pulse width (allowing a complete switching between two stable states). Further, flickering was at a practically acceptable level and a contrast of 115 was obtained.

EXAMPLE 2

A liquid crystal device was prepared and evaluated in the same manner as in Example 1 except that the 1 wt. %-solution in ethanol of the silane coupling agent was changed to a 5 wt. %-solution in a mixture solvent (ethanol/ethylene glycol) of a ladder-type polysilicone containing tin oxide fine particles doped with Sb (particle size=100 Å), and the spin coating conditions were changed to 1100 rpm for 10 sec. to form a 1500 Å-thick alignment control polymer film (not subjected to a uniaxial aligning treatment).

The polymer film showed a volume resistivity in a thickness direction of $10^7$ ohm.cm and a surface energy of 35 dyne/cm.

When the liquid crystal device was subjected to observation of an alignment state of liquid crystal molecules, alignment defects in a shape as shown in FIGS. 3 and 4 and having a size of ca. 50 $\mu$m (length) and ca. 7 $\mu$m (width) were confirmed in the vicinity of the silica beads but an occurrence of a reverse domain from the alignment defects was not observed until a pulse width being 2.0 times as large as a threshold pulse width (allowing a complete switching between two stable states). Further, flickering was at a practically acceptable level and a contrast of 110 was obtained.

Reference Example 1

A liquid crystal device was prepared and evaluated in the same manner as in Example 1 except that the spacer beads were dispersed after the silane coupling agent layer was formed, i.e., the silica beads were not subjected to the surface treatment.

When the liquid crystal device was subjected to observation of an alignment state of liquid crystal molecules, alignment defects in a shape as shown in FIGS. 3 and 4 and having a size of ca. 100 $\mu$m (length) and ca. 10 $\mu$m (width) were confirmed in the vicinity of the silica beads and a revere domain generated from the alignment defects was at a problematic level in terms of image quality. Further, flickering was also at a problematic level and a contrast of 80 was obtained.

EXAMPLE 3

A liquid crystal composition was prepared by mixing the following compounds showing the indicated phase transition series in the indicating proportions.

Compound No.   Structural formula (f)

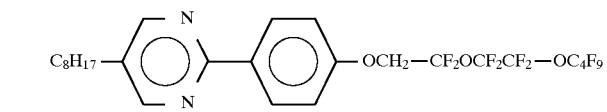

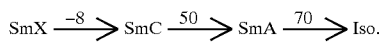

-continued

| Compound No. | Structural formula |
|---|---|
| (g) | 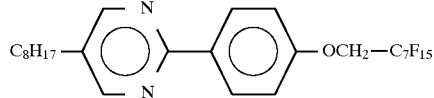<br>SmX $\xrightarrow{71}$ SmC $\xrightarrow{80}$ SmA $\xrightarrow{117}$ Iso. |
| (h) | 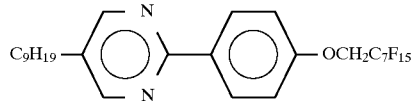<br>SmX $\xrightarrow{71}$ SmC $\xrightarrow{85}$ SmA $\xrightarrow{112}$ Iso. |
| (i) | 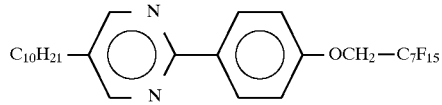<br>SmX $\xrightarrow{75}$ SmC $\xrightarrow{87}$ SmA $\xrightarrow{104}$ Iso. |
| (j) | 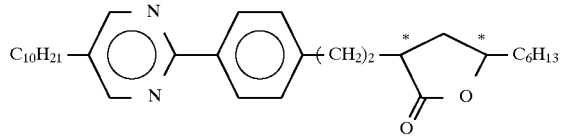 |

In the above, SmX denotes a smectic phase (unidentified).

(Components) (wt. parts)

(f):(g):(h):(i):(j) = 80:33:4:5

The liquid crystal composition showed the following phase transition series, a tilt angle H, and a spontaneous polarization Ps, respectively.

Phase transition temperature (°C.)

Iso $\xrightarrow{75}$ SmA $\xrightarrow{45}$ SmC* $\xrightarrow{0}$ Cry.

(H)(at 25° C.)=27 degrees

Ps (at 25° C.)=+26 nC/cm².

Then, a liquid crystal device was prepared in the following manner.

<Cell B-1>

One 1.1 mm-thick glass substrate provided with a 20 nm-thick ITO film (transparent electrode) was coated with a solution in a mixture solvent of N-methylpyrrolidone/n-butyl cellosolve (=2/1) of a 0.5 wt. %-precursor to a polyimide represented by a recurring unit of the formula shown below by spin coating, followed by pre-drying and hot baking to form a 5 nm-thick alignment control film, which was then rubbed with a nylon cloth as a uniaxial aligning treatment.

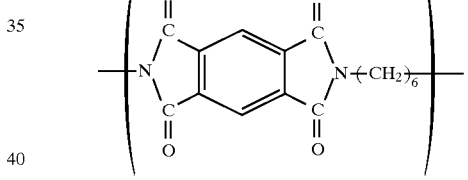

The substrate provided a surface energy of 45 dyne/cm at the surface of the uniaxial aligning-treatment alignment control film.

On the above substrate, a sealing agent ("Struct Bond", mfd. by Mitsui Toatsu Kagaku K.K.) was applied at a peripheral portion thereof by printing.

Further, therein, silica beads (average particle size=ca. 2.1 μm) were dispersed at a (dispersion) density of 300 particles/mm² by using a 1.0 wt. % solution thereof in ethanol.

The other 1.1 mm-thick glass substrate provided with a 20 nm-thick ITO film was coated with a mixture solution in isopropyl alcohol (IPA) of epoxy resin adhesive particles ("Torepearl", mfd. by Toray K.K., average particle size=5 μm) dispersed in silane coupling agent (octadecyltriethoxysilane="ODS-E", mfd. by Chisso K.K.) in a mixing ratio (IPA/Adhesive/ODS-E=100/0.02/0.1 by weight) by spin coating at 2000 rpm for 20 sec., followed by drying at 80° C., thus effecting a surface treatment of the adhesive particles with the silane coupling agent and formation of an alignment control film (not subjected to a uniaxial aligning treatment) at the same time. At this time, the adhesive particles were dispersed at a (dispersion) density of about 120 particles/mm².

The thus-prepared substrate provided a surface energy of 26 dyne/cm at the surface of the non-uniaxial aligning-treated alignment control film.

The two substrates prepared above were applied to each other to form a blank cell with a cell gap of ca. 1.8 μm, which was then filled with the above-prepared liquid crystal composition (Example 3) in an isotropic liquid state under vacuum (reduced pressure), followed by a gradual cooling to room temperature at a rate of 0.1° C./min. to form a liquid crystal device.

When the liquid crystal device was subjected to observation of an alignment state of liquid crystal molecules, alignment defects in a shape as shown in FIGS. 3 and 4 and having a size of ca. 100 μm (length) and ca. 10 μm (width) were confirmed in the vicinity of the silica beads. Similarly, in the vicinity of the adhesive particles, alignment defects having a size of ca. 65 μm (length) and ca. 10 μm (width) were also confirmed. However, an occurrence of a reverse domain from the alignment defects was not observed until a pulse width being 2.2 times as large as a threshold pulse width (allowing a complete switching between two stable states). Further, flickering was at a practically acceptable level and a contrast of 70 was obtained. When the liquid crystal device was fixed in a metal frame and was subjected to a drop test by exerting a shock (40 G) on the device no alignment deterioration was observed.

EXAMPLE 4

A liquid crystal device was prepared and evaluated in the same manner as in Example 3 except that the 1 wt. %-solution in ethanol of the silane coupling agent was changed to a 5 wt. %-solution in a mixture solvent (ethanol/ethylene glycol) of a ladder-type polysilicone containing tin oxide fine particles doped with Sb (particle size=100 Å), and the spin coating conditions were changed to 1100 rpm for 10 sec. to form a 1500 Å-thick alignment control polymer film (not subjected to a uniaxial aligning treatment).

The polymer film showed a volume resistivity in a thickness direction of $10^7$ ohm.cm and a surface energy of 35 dyne/cm.

When the liquid crystal device was subjected to observation of an alignment state of liquid crystal molecules, alignment defects in a shape as shown in FIGS. 3 and 4 and having a size of ca. 100 μm (length) and ca. 10 μm (width) were confirmed in the vicinity of the silica beads. Similarly, in the vicinity of the adhesive particles, alignment defects having a size of ca. 65 μm (length) and ca. 10 μm (width) were also confirmed. However, an occurrence of a reverse domain from the alignment defects was not observed until a pulse width being 2.0 times as large as a threshold pulse width (allowing a complete switching between two stable states). Further, flickering was at a practically acceptable level and a contrast of 68 was obtained. When the liquid crystal device was fixed in a metal frame and was subjected to a drop test by exerting a shock (40 G) on the device no alignment deterioration was observed.

Reference Example 2

A liquid crystal device was prepared and evaluated in the same manner as in Example 3 except that the adhesive particles ("Torepearl") were dispersed after the silane coupling agent layer was formed, i.e., the adhesive particles were not subjected to the surface treatment.

When the liquid crystal device was subjected to observation of an alignment state of liquid crystal molecules, alignment defects in a shape as shown in FIGS. 3 and 4 and having a size of ca. 100 μm (length) and ca. 10 μm (width) were confirmed in the vicinity of the silica beads. Similarly, in the vicinity of the adhesive particles, alignment defects having a size of ca. 120 μm (length) and ca. 20 μm (width) were also confirmed. A revere domain generated from the alignment defects was at a problematic level in terms of image quality. Further, flickering was also at a problematic level and a contrast of 50 was obtained. Further, when the liquid crystal was fixed in a metal frame and was subjected to a drop test by exerting a shock (20 G) on the device, an alignment deterioration and a region wherein a complete switching between two stable states were confirmed.

EXAMPLE 5

A liquid crystal device was prepared and evaluated in the same manner as in Example 3 except that the solution in IPA of the silane coupling agent and the adhesive particles for forming the alignment control film (which has not been subjected to a uniaxial aligning treatment) was changed to a solution i IPA of a mixture of a silane coupling agent (ODS-E"), epoxy resin adhesive particles ("Torepearl", average particle size=5 μm), and silica beads (average particle size=2 μm) in a mixing ratio (ODS-E/Adhesive/Silica=0.5 wt. %/0.05 wt. %/0.01 wt. %).

When the liquid crystal device was subjected to observation of an alignment state of liquid crystal molecules, alignment defects in a shape as shown in FIGS. 3 and 4 were confirmed in the vicinity of the silica beads and the adhesive particles, respectively, in a size of ca. 50 μm (length) and ca. 7 μm (width) for the silica beads and in a size of ca. 65 μm (length) and ca. 10 μm (width) for the adhesive particles were confirmed.

However, an occurrence of a reverse domain from the alignment defects was not observed until a pulse width being 2.2 times as large as a threshold pulse width (allowing a complete switching between two stable states). Further, flickering was at a practically acceptable level and a contrast of 90 was obtained.

As described hereinabove, according to the present invention, by suppressing an occurrence of a reverse domain leading to a lowering in contrast and flickering and employing a simplified production process, it is possible to realize a liquid crystal device, as a switching element and a light valve element, providing an excellent cost performance, a good display quality, a large picture area, a high definition and a high reliability. The liquid crystal device is also effective in improving display performances of a resultant liquid crystal apparatus.

What is claimed is:

1. A liquid crystal device, comprising:
    a pair of oppositely disposed substrates including a first substrate provided with a first alignment control layer which has been subjected to a uniaxial aligning treatment and a second substrate provided with a second alignment control layer which has not been subjected to a uniaxial aligning treatment, said second alignment control layer having a surface energy of at most 35 dyne/cm. and a volume resistivity of $10^4$–$10^8$ ohm.cm.,
    a sealing member disposed so as to seal up a peripheral portion of the first and second substrates to form a spacing therebetween, and
    a dispersion member and a liquid crystal disposed in the spacing while contacting the first and second aligning control layers,
    wherein said dispersion member has been subjected to a surface treatment with a material comprising the second alignment control layer.

2. A device according to claim 1, wherein said liquid crystal is in a chiral smectic phase.

3. A device according to claim 1, wherein said liquid crystal lacks a cholesteric phase on temperature decrease.

4. A device according to claim 1, wherein said dispersion member has a surface layer comprising a material constituting the second alignment control layer.

5. A device according to claim 1, wherein said dispersion member comprises a spacer member for determining a cell gap between the first and second substrates.

6. A device according to claim 5, wherein said spacer member is dispersed at a density of 100–500 particles/mm$^2$.

7. A device according to claim 5, wherein said spacer member has an average particle size of 1–5 µm.

8. A device according to claim 5, wherein said spacer member comprises silica beads.

9. A device according to claim 1, wherein said dispersion member comprises an adhesive.

10. A device according to claim 9, wherein said adhesive is dispersed at a density of 10–300 particles/mm$^2$.

11. A device according to claim 9, wherein said adhesive comprises a thermosetting resin.

12. A device according to claim 11, wherein said thermosetting resin comprises epoxy resin.

13. A device according to claim 1, wherein said uniaxial aligning treatment comprises rubbing.

14. A device according to claim 1, wherein said first alignment control layer comprises a film of polyimide having a recurring unit represented by the following formula (P):

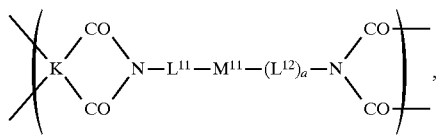

in which
K is

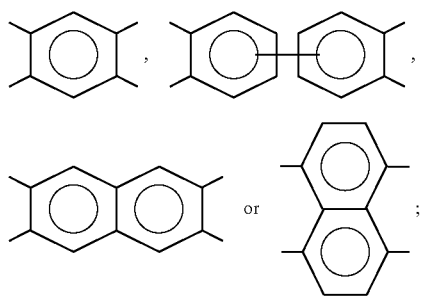

$L^{11}$ and $L^{12}$ independently denote

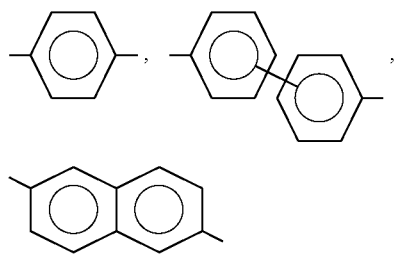

or an alkylene group having 1–20 carbon atoms;
$M^{11}$ is a single bond or —O—; and
a is 0, 1 or 2.

15. A device according to claim 1, wherein said second alignment control layer comprises at least one species of a material selected from the group consisting of a silane coupling agent, a fluorine-containing organic polymer and a silicone polymer.

16. A device according to claim 1, wherein said second alignment control layer comprises a film comprising a matrix material containing fine particles dispersed in the matrix material.

17. A device according to claim 2, wherein said liquid crystal is a liquid crystal composition comprising at least one species of fluorine-containing mesomorphic compound comprising a fluorocarbon terminal portion and a hydrocarbon terminal portion, the terminal portions being connected with a central core, and having a smectic phase or a latent smectic phase.

18. A device according to claim 17, wherein said fluorine-containing mesomorphic compound is represented by the general formula (I):

Formula (I)

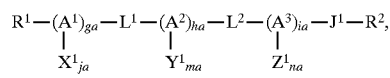

where $A^1$, $A^2$ and $A^3$ are each independently

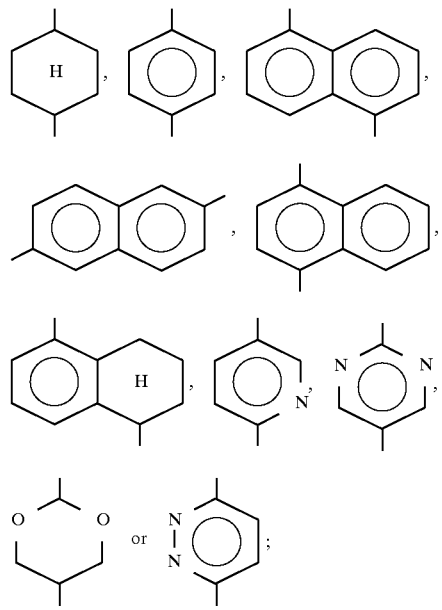

ga, ha and ia are independently an integer of 0–3 with the proviso that the sum of ga+ha+ia be at least 2;

$L^1$ and $L^2$ are each independently a covalent bond, —CO—O—, —O—CO—, —COS—, —S—CO—, —CO—Se—, —Se—CO—, —CO—Te—, —Te—CO—, —CH$_2$CH$_2$—, —CH=CH—, —C≡C—, —CH=N—, —N=CH—, —CH$_2$—O—, —O—CH$_2$—, —CO— or —O—;

$X^1$, $Y^1$ and $Z^1$ are each a substituent of $A^1$, $A^2$ and $A^3$, respectively, and each of $X^1$, $Y^1$ and $Z^1$ are independently —H, —Cl, —F, —Br, —I, —OH, —OCH$_3$, —CH$_3$, —CN or —NO$_2$;

each ja, ma and na are independently an integer of 0–4;

$J^1$ is —CO—O—(CH$_2$)$_{ra}$—, —O—(CH$_2$)$_{ra}$—, —(CH$_2$)$_{ra}$—, —O—SO$_2$—, —SO$_2$—, —SO$_2$—(CH$_2$)$_{ra}$—, —O—(CH$_2$)$_{ra}$—O—(CH$_2$)$_{rb}$—, —(CH$_2$)$_{ra}$—N(C$_{pa}$H$_{2pa+1}$)—SO$_2$— or —(CH$_2$)$_{ra}$—N(C$_{pa}$H$_{2pa+1}$)—CO—; where ra and rb are independently 1–20, and pa is 0–4;

$R^1$ is $-O-C_{qa}H_{2qa}-O-C_{qb}H_{2qb+1}$, $-C_{qa}H_{2qa}-O-C_{qb}H_{2qb+1}$, $-C_{qa}H_{2qa}-R^3$, $-O-C_{qa}H_{2qa}-R^3$, $-CO-O-C_{qa}H_{2qa}-R^3$, or $-O-CO-C_{qa}H_{2qa}-R^3$ which may be either straight chain or branched; where $R^3$ is $-O-CO-C_{qb}H_{2qb+1}$, $-CO-O-C_{qb}H_{2qb+1}$, $-H$, $-Cl$, $-F$, $-CF_3$, $-NO_2$ or $-CN$; and qa and qb are independently 1–20;

$R^2$ is $C_{xa}F_{2xa}-X$, where X is $-H$ or $-F$, xa is an integer of 1–20.

19. A device according to claim 17, wherein said fluorine-containing mesomorphic compound is represented by the general formula (II):

Formula (II)

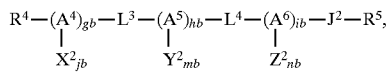

wherein $A^4$, $A^5$ and $A^6$ are each independently

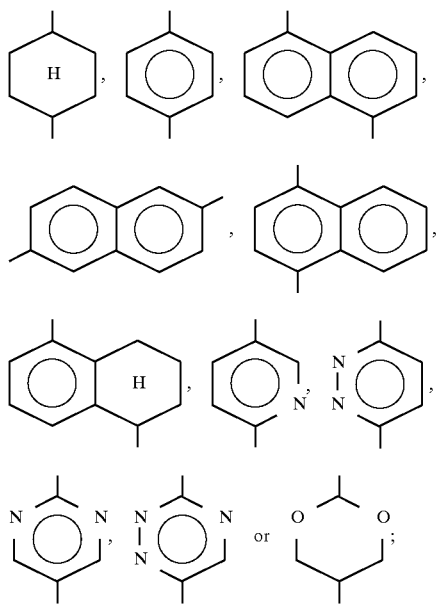

gb, hb and ib are each independently an integer of 0–3 with the proviso that the sum of gb+hb+ib be at least 2; each $L^3$ and $L^4$ are independently a covalent bond, $-CO-O-$, $-O-CO-$, $-CO-S-$, $-S-CO-$, $-CO-Se-$, $-Se-CO-$, $-CO-Te-$, $-Te-CO-$, $-(CH_2CH_2)_{ka}-$ (ka is 1–4), $-CH=CH-$, $-C\equiv C-$, $-CH=N-$, $-N=CH-$, $-CH_2-O-$, $-O-CH_2-$, $-CO-$ or $-O-$;

$X^2$, $Y^2$ and $Z^2$ are each a substituent of $A^4$, $A^5$ and $A^6$, respectively, and each $X_2$, $Y_2$ and $Z_2$ are independently $-H$, $-Cl$, $-F$, $-Br$, $-I$, $-OH$, $-OCH_3$, $-CH_3$, $-CF_3$, $-O-CF_3$, $-CN$ or $-NO_2$; each jb, mb and nb are independently an integer of 0–4;

$J^2$ is $-CO-O-C_{rc}H_{2rc}-$, $-O-C_{rc}H_{2rc}-$, $-C_{rc}H_{2rc}-$, $-O-(C_{sa}H_{2sa}-O)_{ta}-C_{rd}H_{2rd}-$, $-O-SO_2-$, $-SO_2-$, $-SO_2-C_{rc}H_{2rc}-$, $-C_{rc}H_{2rc}-N(C_{pb}H_{2pb+1})-SO_2-$ or $-C_{rc}H_{2rc}-N(C_{pb}H_{2pb+1})-CO-$; rc and rd are independently 1–20; sa is independently 1–10 for each $(C_{sa}H_{2sa}-O)$, ta is 1–6; and pb is 0–4;

$R^4$ is $-O-(C_{qc}H_{2qc}-O)_{wa}-C_{qd}H_{2qd+1}$, $-(C_{qc}H_{2qc}-O)_{wa}-C_{qd}H_{2qd+1}$, $-C_{qc}H_{2qc}-R^6$, $-O-C_{qc}H_{2qc}-R^6$, $-CO-O-C_{qc}H_{2qc}-R^6$, or $O-CO-C_{qc}H_{2qc}-R^6$ which may be either straight chain or branched; $R^6$ is $-O-CO-C_{qd}H_{2qd+1}$; $-CO-O-C_{qd}H_{2qd+1}$, $-Cl$, $-F$, $-CF_3$, $-NO_2$, $-CN$ or $-H$; qc and qd are independently an integer of 1–20; wa is an integer of 1–10;

$R^5$ is $(C_{xb}F_{2xb}-O)_{za}-C_{ya}F_{2ya+1}$, wherein xb is independently 1–10 for each $(C_{xb}F_{2xb}-O)$; ya is 1–10; and za is 1–10.

20. A device according to claim 1, wherein said liquid crystal has ferroelectricity.

21. A liquid crystal apparatus, comprising: a liquid crystal device according to claim 1 and a drive means for driving the liquid crystal device.

22. A process for producing a liquid crystal device comprising: a pair of oppositely disposed substrates including a first substrate provided with a first alignment control layer which has been subjected to a uniaxial aligning treatment and a second substrate provided with a second alignment control layer which has not been subjected to a uniaxial aligning treatment, said second alignment control layer having a surface energy of at most 35 dyne/cm. and a volume resistivity of $10^4$–$10^8$ ohm.cm.; a sealing member disposed so as to seal up a peripheral portion of the first and second substrates to form a spacing therebetween; and a dispersion member and a liquid crystal disposed in the spacing while contacting the first and second aligning control layers, the process comprising:

a step of forming the first alignment control layer on the first substrate, and a step of surface-treating the dispersion member with a material comprising the second alignment control layer.

23. A process according to claim 22, wherein said step of surface-treating is performed by applying onto the first substrate a solution of a mixture of the dispersion member and the material constituting the second alignment control layer.

24. A process according to claim 22, wherein said dispersion member comprises a spacer member for determining a cell gap between the first and second substrates.

25. A process according to claim 22, wherein said dispersion member comprises an adhesive.

* * * * *

UNITED STATES PATENT AND TRADEMARK OFFICE
CERTIFICATE OF CORRECTION

PATENT NO. : 5,885,482

DATED : March 23,1999

INVENTOR(S) : MASANOBU ASAOKA ET AL.                Page 1 of 3

It is certified that error appears in the above-identified patent and that said Letters Patent is hereby corrected as shown below:

On the title page, item:

[56] REFERENCES CITED

Foreign Patent Documents
"2142753" should read --2-142753--.

COLUMN 1

Line 29, "use" should be deleted.

COLUMN 5

Line 3, "diving" should read --driving--.
Line 40, "substrate" should read --substrates--.

COLUMN 9

Line 44, "an" should be deleted.

COLUMN 10

Line 43, "preferably" should read --preferably be--.
Line 45, "is" should read -are--.
Line 46, "subjected" should read --subjected to--.

UNITED STATES PATENT AND TRADEMARK OFFICE
CERTIFICATE OF CORRECTION

PATENT NO.   :  5,885,482

DATED        :  March 23, 1999

INVENTOR(S)  :  MASANOBU ASAOKA ET AL.

It is certified that error appears in the above-identified patent and that said Letters Patent is hereby corrected as shown below:

COLUMN 12

Line 12, "repeat" should read --repeats--.
Line 46, "preferably" should read --preferably be--.

COLUMN 14

Line 54, "—C=C—," should read ---—C≡C—,--.

COLUMN 16

Line 8, "—C=C—," should read ---—C≡C—,--
Line 20, "$(C_{2pb}H_{2pb+1})$" should read --$(C_{pb}H_{2pb+1})$--

COLUMN 31

After Comp. I-103, "though" should read --through--.

COLUMN 53

Line 32, "(In-ss)" should read --(In-Ss)--.

UNITED STATES PATENT AND TRADEMARK OFFICE
CERTIFICATE OF CORRECTION

PATENT NO.  : 5,885,482

DATED       : March 23, 1999

INVENTOR(S) : MASANOBU ASAOKA ET AL.

It is certified that error appears in the above-identified patent and that said Letters Patent is hereby corrected as shown below:

COLUMN 58

Line 45, "revere" should read --reverse--.

COLUMN 61

Line 67, "revere" should read --reverse--.

COLUMN 62

Line 15, "i" should read --in--.

Signed and Sealed this

Eighteenth Day of April, 2000

Attest:

Q. TODD DICKINSON

*Attesting Officer*    *Director of Patents and Trademarks*